(12) United States Patent
Yamamoto et al.

(10) Patent No.: US 11,021,012 B2
(45) Date of Patent: Jun. 1, 2021

(54) BEARING DEVICE FOR VEHICLE WHEEL

(71) Applicant: NTN CORPORATION, Osaka (JP)

(72) Inventors: Kazunari Yamamoto, Iwata (JP); Syougo Suzuki, Iwata (JP); Shunsuke Morita, Iwata (JP); Chinami Kitanaka, Iwata (JP)

(73) Assignee: NTN CORPORATION, Osaka (JP)

( * ) Notice: Subject to any disclaimer, the term of this patent is extended or adjusted under 35 U.S.C. 154(b) by 395 days.

(21) Appl. No.: 15/762,846

(22) PCT Filed: Sep. 23, 2016

(86) PCT No.: PCT/JP2016/078061
§ 371 (c)(1),
(2) Date: Mar. 23, 2018

(87) PCT Pub. No.: WO2017/051886
PCT Pub. Date: Mar. 30, 2017

(65) Prior Publication Data
US 2018/0257430 A1   Sep. 13, 2018

(30) Foreign Application Priority Data

Sep. 25, 2015 (JP) .................. 2015-188831
Feb. 19, 2016 (JP) .................. 2016-030508
Feb. 19, 2016 (JP) .................. 2016-030509

(51) Int. Cl.
*B60B 27/00* (2006.01)
*F16C 19/18* (2006.01)
*B60B 27/02* (2006.01)

(52) U.S. Cl.
CPC ...... *B60B 27/0094* (2013.01); *B60B 27/0005* (2013.01); *F16C 19/182* (2013.01);
(Continued)

(58) Field of Classification Search
CPC . B60B 27/00; B60B 27/0005; B60B 27/0078; B60B 27/0094; F16C 19/185
See application file for complete search history.

(56) References Cited

U.S. PATENT DOCUMENTS 5,209,701 A * 5/1993 Ishikawa ............. B60B 27/0005
301/105.1
7,121,632 B2 * 10/2006 Grabaum ................ B60B 27/00
301/105.1
(Continued)

FOREIGN PATENT DOCUMENTS

JP   2002-347402   12/2002
JP   2003-25803    1/2003
(Continued)

OTHER PUBLICATIONS

Notice of Reasons for Refusal dated Jul. 9, 2019 in corresponding Japanese Patent Application No. 2016-030508 with English translation.
(Continued)

*Primary Examiner* — Jason R Bellinger
(74) *Attorney, Agent, or Firm* — Wenderoth, Lind & Ponack, L.L.P.

(57) ABSTRACT

A bearing device (1) for a vehicle wheel provided with: an outer member (2); and an inner member comprising a hub wheel (3), and at least one inner wheel (4) press-fitted into the small-diameter ridge (3A) of the hub wheel (3); wherein a belt-shaped part (2F) that radially protrudes by a protrusion amount (P1) is formed over a prescribed width (W1) in the outer peripheral surface of the outer member (2) so that at least part of the belt-shaped part (2F) radially overlaps the outside rolling surface (2D) which is on the vehicle-wheel-attachment-flange-facing side of the outer member (2). The present invention addresses the problem of providing a bearing device for a vehicle wheel in which the amount of
(Continued)

deformation in an opening of an outer member can be reduced and decreases in rolling fatigue service life can be prevented while keeping overall weight increase to a minimum.

8 Claims, 31 Drawing Sheets

(52) U.S. Cl.
CPC ............ *F16C 19/185* (2013.01); *B60B 27/02* (2013.01); *B60B 2380/12* (2013.01); *B60B 2380/73* (2013.01); *B60B 2900/212* (2013.01); *B60B 2900/321* (2013.01); *F16C 2326/02* (2013.01)

(56) References Cited

U.S. PATENT DOCUMENTS

| | | | |
|---|---|---|---|
| 7,708,353 B2 * | 5/2010 | Inoue | ............ B60B 27/00 188/17 |
| 7,832,942 B2 | 11/2010 | Komori et al. | |
| 2008/0190535 A1 * | 8/2008 | Concu | ............ B60C 23/003 152/416 |
| 2009/0154864 A1 | 6/2009 | Komori et al. | |
| 2019/0299710 A1 * | 10/2019 | Kobayashi | ............ B60B 27/02 |

FOREIGN PATENT DOCUMENTS

| | | |
|---|---|---|
| JP | 2006-29543 | 2/2006 |
| JP | 2007-153051 | 6/2007 |
| JP | 2008-155837 | 7/2008 |
| JP | 2012-219971 | 11/2012 |
| JP | 2014-101952 | 6/2014 |
| JP | 2014-190466 | 10/2014 |

OTHER PUBLICATIONS

International Search Report dated Dec. 20, 2016 in International (PCT) Application No. PCT/JP2016/078061.

* cited by examiner

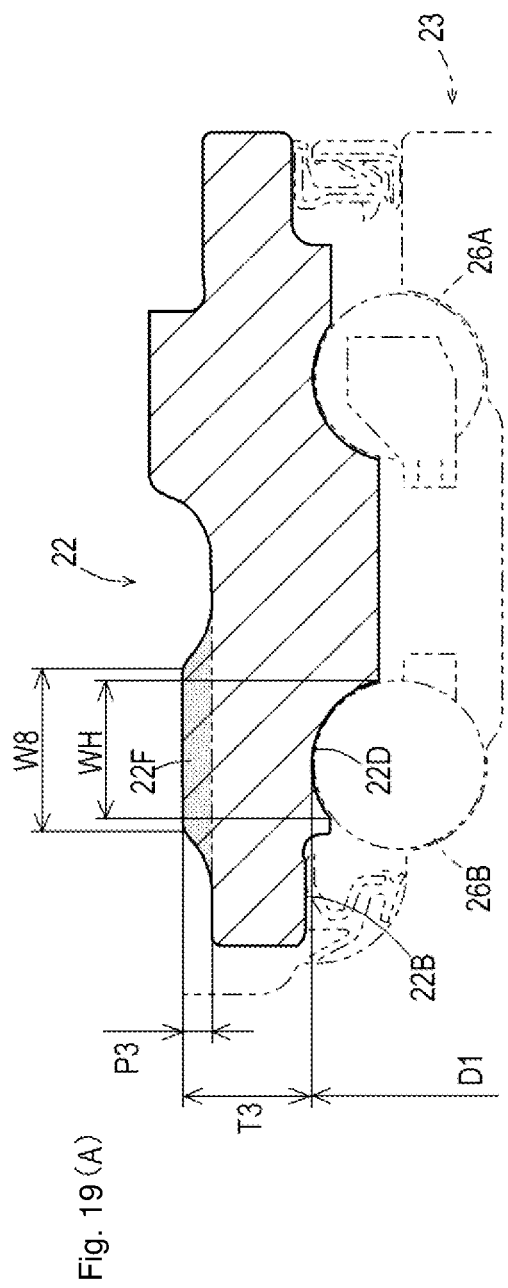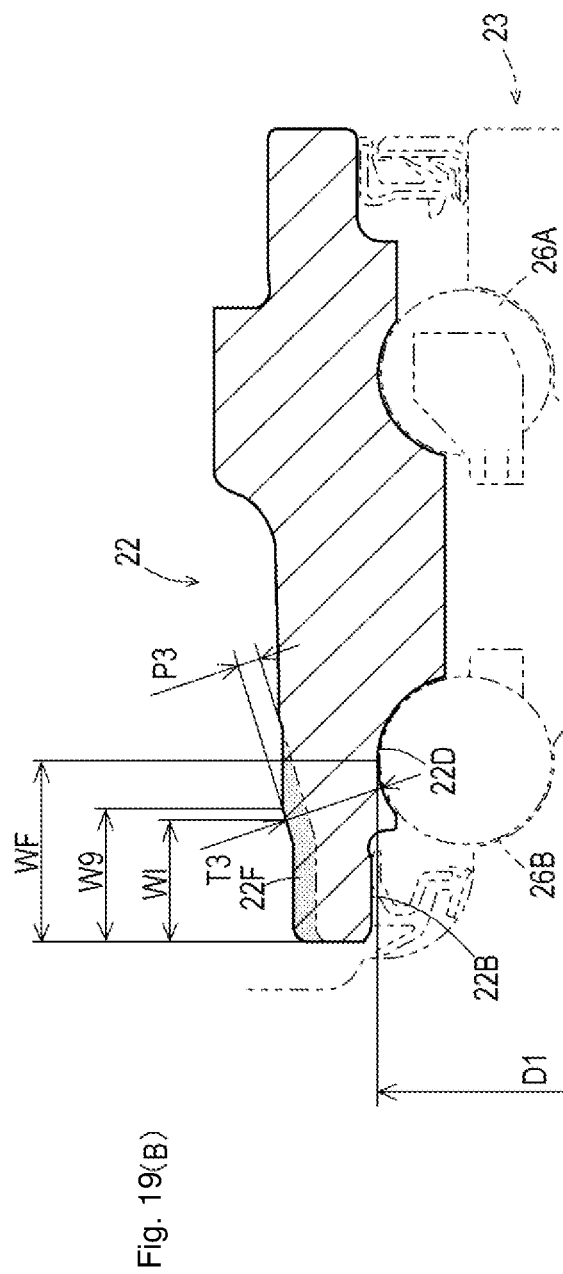
Fig. 19 (A)
Fig. 19(B)

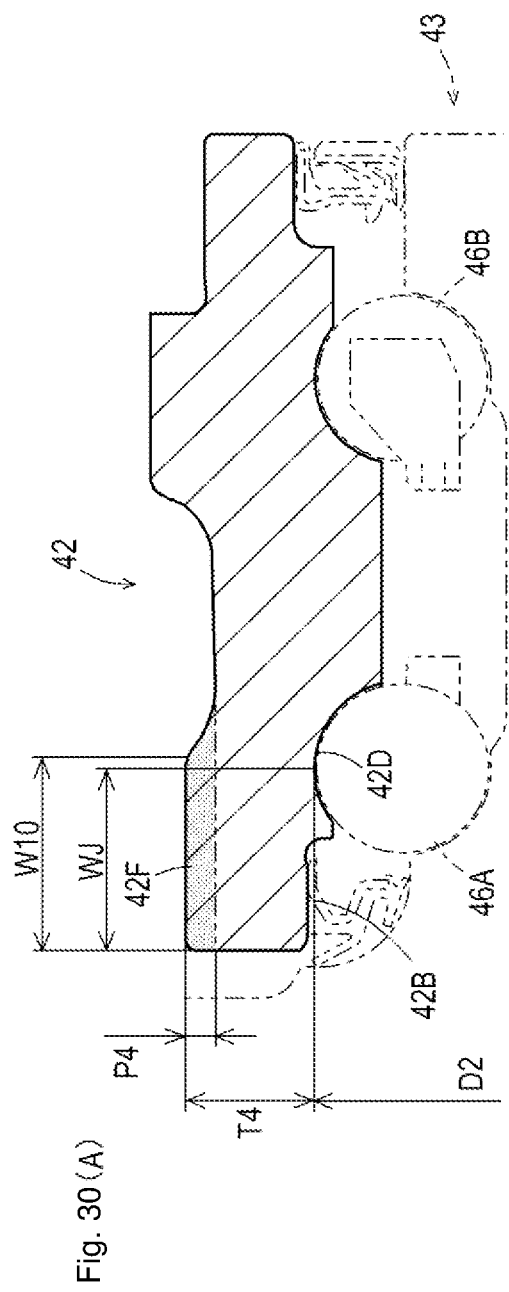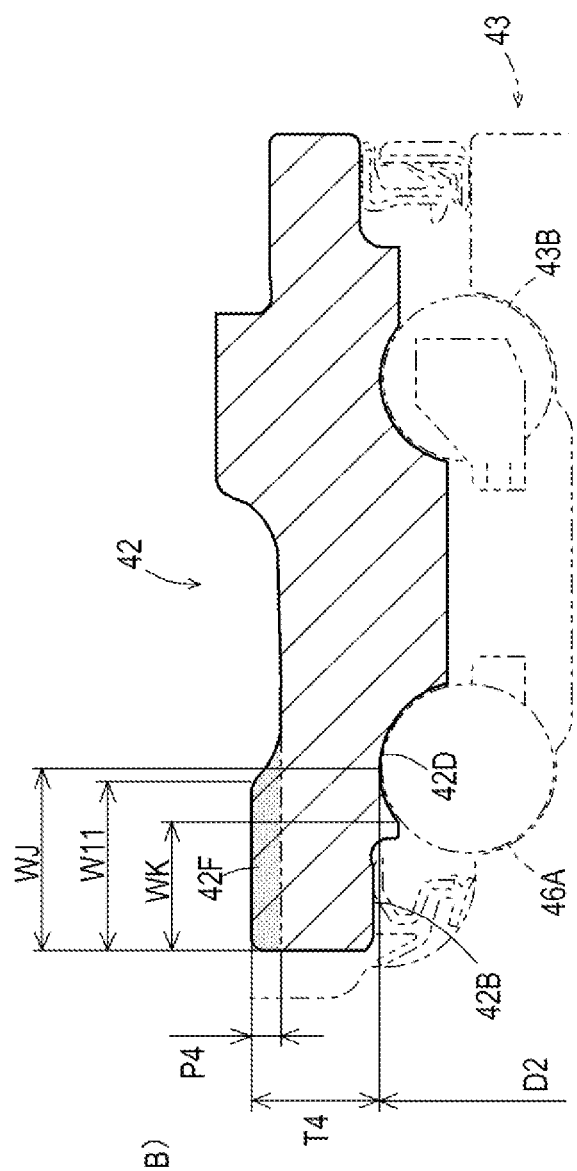

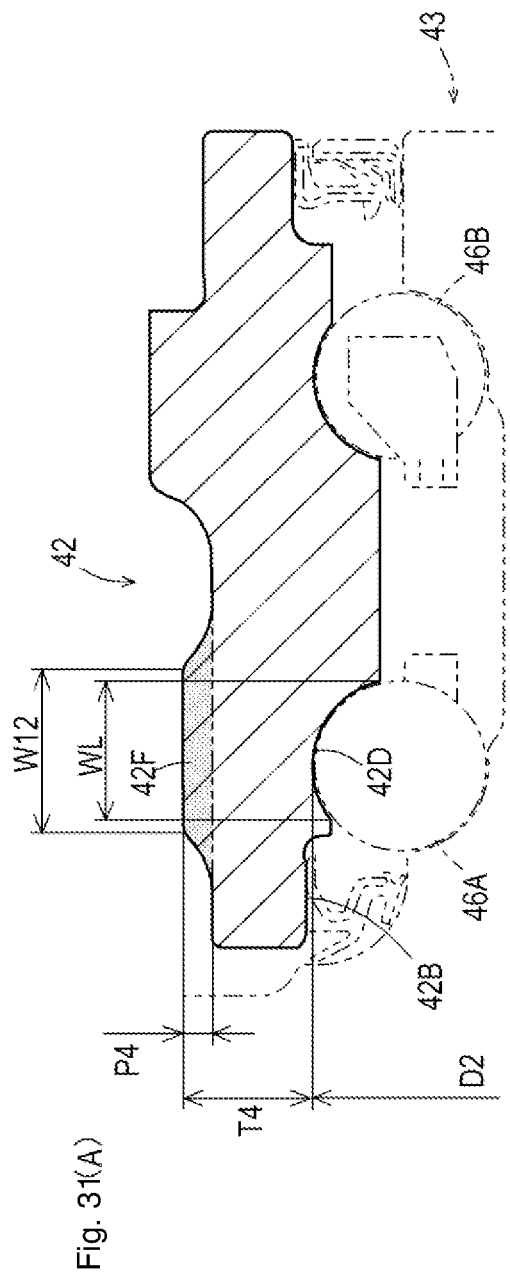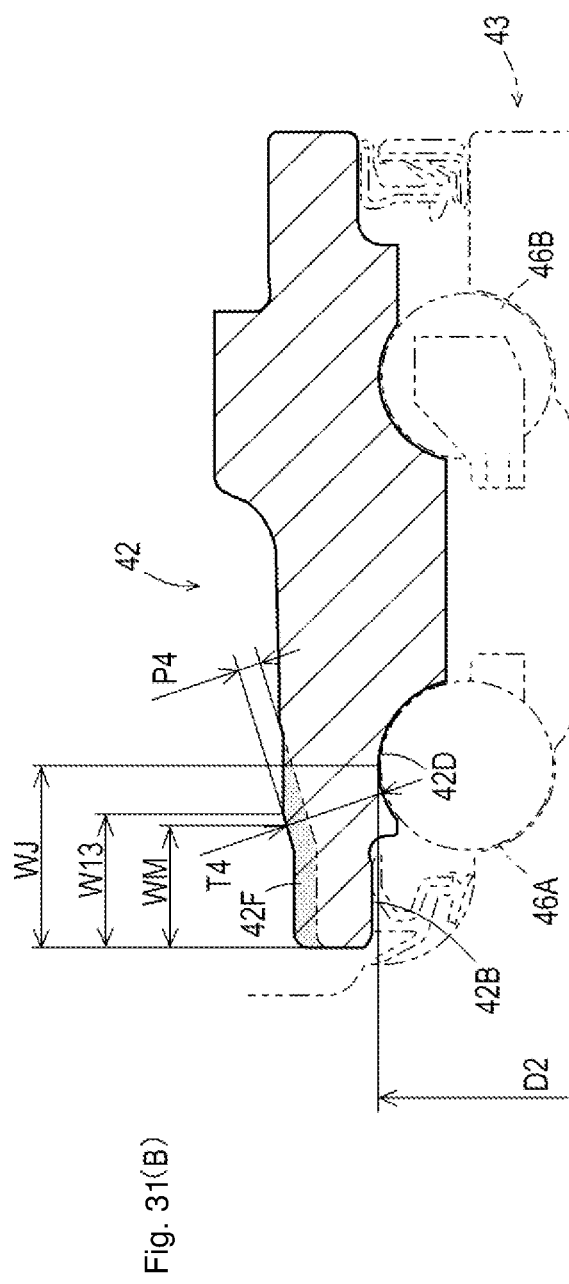
Fig. 31(A)
Fig. 31(B)

BEARING DEVICE FOR VEHICLE WHEEL

BACKGROUND OF THE INVENTION

1. Technical Field

The present invention relates to a bearing device for vehicle wheels. In particular, the present invention relates to a bearing device for vehicle wheels with improved life duration of its outer member.

2. Description of the Related Art

Conventionally, there is known a bearing device for vehicle wheels that rotatably supports a wheel in a suspension device for an automobile or the like. In the bearing device for vehicle wheels, a hub ring connected to the wheel is rotatably supported by an outer member via rolling elements. The bearing device for vehicle wheels is secured to a knuckle of the vehicle via a mounting flange of the outer member. In other words, the bearing device for vehicle wheels rotatably supports the hub ring connected to the wheel in a state in which the outer member is secured to the knuckle of the vehicle. For the bearing device for vehicle wheels, a multi-row angular contact ball bearing with desired bearing stiffness and low rotary torque in view of improvement of fuel consumption is most commonly used. The bearing device for vehicle wheels configures the angular contact ball bearing by giving a predetermined contact angle to the rolling elements to thus cause the rolling elements to be brought into contact with the outer member and the hub ring. The outer member of the bearing device for vehicle wheels is provided with rolling surfaces for rows of the rolling elements, near an opening on a side of a wheel mounting flange of the hub ring (outer side) and near an opening on a side of a mounting flange of the outer member (inner side). The outer member supports a load from the wheel with the rolling surfaces via the rolling elements that support the hub ring.

In such a bearing device for vehicle wheels, when the vehicle stops or moves forward or backward, a load from the vehicle works on substantially the center of the multi-row angular contact ball bearing. On the other hand, when the vehicle turns, a radial load and an axial load exerted on the wheel on a side opposite to a turning direction (a left side of the vehicle when the vehicle turns right) increase. Thus, some bearing devices for vehicle wheels increase bearing stiffness by improving the stiffness of the row of rolling elements on the outer side to thus prevent deterioration in rolling fatigue life. One example is described in JP-A 2008-155837.

In the bearing device for vehicle wheels described in JP-A 2008-155837, the number of rolling elements in a row of rolling elements on an outer side is increased by setting a pitch circle diameter of a row of rolling elements on the outer side to be larger than a pitch circle diameter of a row of rolling elements on an inner side, of multi-row rolling elements, and thus stiffness of the row of rolling elements is improved. However, according to this bearing device for vehicle wheels, as the pitch circle diameter of the row of rolling elements on the outer side is increased, a diameter of an opening of the outer member on the outer side is also increased. Further, each opening of the outer member includes a fitting portion for providing a sealing member that prevents rain water or the like from entering into the outer member, a reference surface for processing, and the like. Therefore, the bearing device for vehicle wheels has possibilities that, when the radial load or the axial load applied to the rolling surface of the outer member on the outer side increases due to turning movement of the vehicle, the opening on the outer side, that is apart from the mounting flange secured to the knuckle, can deform into a substantial elliptical shape, leading to deterioration of roundness of the rolling surface and to a decrease in the rolling fatigue life.

SUMMARY OF THE INVENTION

1. Problems to be Solved by the Invention

The present invention is made in view of the above circumstances, and aims to provide a bearing device for vehicle wheels capable of reducing an amount of deformation of an opening of an outer member while minimizing an increase of an overall weight, and thus preventing deterioration in rolling fatigue life.

2. Solutions to the Problems

A bearing device for vehicle wheels according to the present invention includes: an outer member integrally having a vehicle body mounting flange on an outer periphery, and having a multi-row annular outer rolling surface integrally provided on an inner periphery; an inner member having a hub ring having a wheel mounting flange for attachment to a wheel integrally at one end portion and a small-diameter stepped portion extending in an axial direction on an outer periphery, and at least one inner ring press-fitted into the hub small-diameter stepped portion, and having multi-row annular inner rolling surface provided on an outer periphery facing the multi-row outer rolling surface; and multi-row rolling elements disposed in a rollable manner between the inner rolling surface and the outer rolling surface, in which a thickened portion that is protruded by a predetermined amount in a radial direction with a predetermined width is provided so that at least a part on an outer peripheral surface of the outer member overlaps the outer rolling surface on the wheel mounting flange side of the outer member in a radial direction of the outer member.

In the bearing device for vehicle wheels of the present invention, the thickened portion is preferably provided so as to overlap a portion of the outer rolling surface closest to the outer peripheral surface of the outer member in the radial direction of the outer member.

In the bearing device for vehicle wheels according to the present invention, the thickened portion is preferably provided so as to overlap a maximum outer diameter portion of the annular outer rolling surface in the radial direction of the outer member.

In the bearing device for vehicle wheels of the present invention, the thickened portion is preferably provided so as to cover a portion where a straight line passing through a rolling element contact point of the outer rolling surface and a rolling element contact point of the inner rolling surface intersects the outer peripheral surface of the outer member.

3. Effects of the Invention

According to the bearing device for vehicle wheels, a thickness of the portion of the outer member near the opening on the side of the wheel mounting flange where a thickness of the outer member is decreased by the outer rolling surface is increased. This makes it possible to reduce an amount of deformation of the opening of the outer member while minimizing the increase of the overall weight and to prevent deterioration in rolling fatigue life.

According to the bearing device for vehicle wheels, the thickness of the portion of the outer member near the opening on the side of the wheel mounting flange, where the thickness of the outer member is most decreased by the outer rolling surface, is increased. This makes it possible to reduce the amount of deformation of the opening of the outer member while minimizing the increase of the overall weight and to prevent deterioration in rolling fatigue life.

According to the bearing device for vehicle wheels, the thickness of the portion of the outer member near the opening on the side of the wheel mounting flange where the outer rolling surface receives the force is increased. This makes it possible to reduce the amount of deformation of the opening of the outer member while minimizing the increase of the overall weight and to prevent deterioration in rolling fatigue life.

BRIEF DESCRIPTION OF THE DRAWINGS

FIG. 5 (B) is a cross-sectional view illustrating an overall configuration of a bearing device for vehicle wheels of the second embodiment after the thickened portion is provided.

FIG. 19 is a cross-sectional view illustrating a main part structure of a bearing device for vehicle wheels of another embodiment.

FIG. 30 is a cross-sectional view illustrating a main part structure of a bearing device for vehicle wheels of another embodiment.

FIG. 31 is a cross-sectional view illustrating a main part structure of a bearing device for vehicle wheels of another embodiment.

DETAILED DESCRIPTION OF EMBODIMENTS OF THE INVENTION

First Embodiment

Hereinafter, with reference to FIG. 1 and FIG. 2, a bearing device for vehicle wheels 1 as a first embodiment of a bearing device for vehicle wheels will be described.

Figure 1:
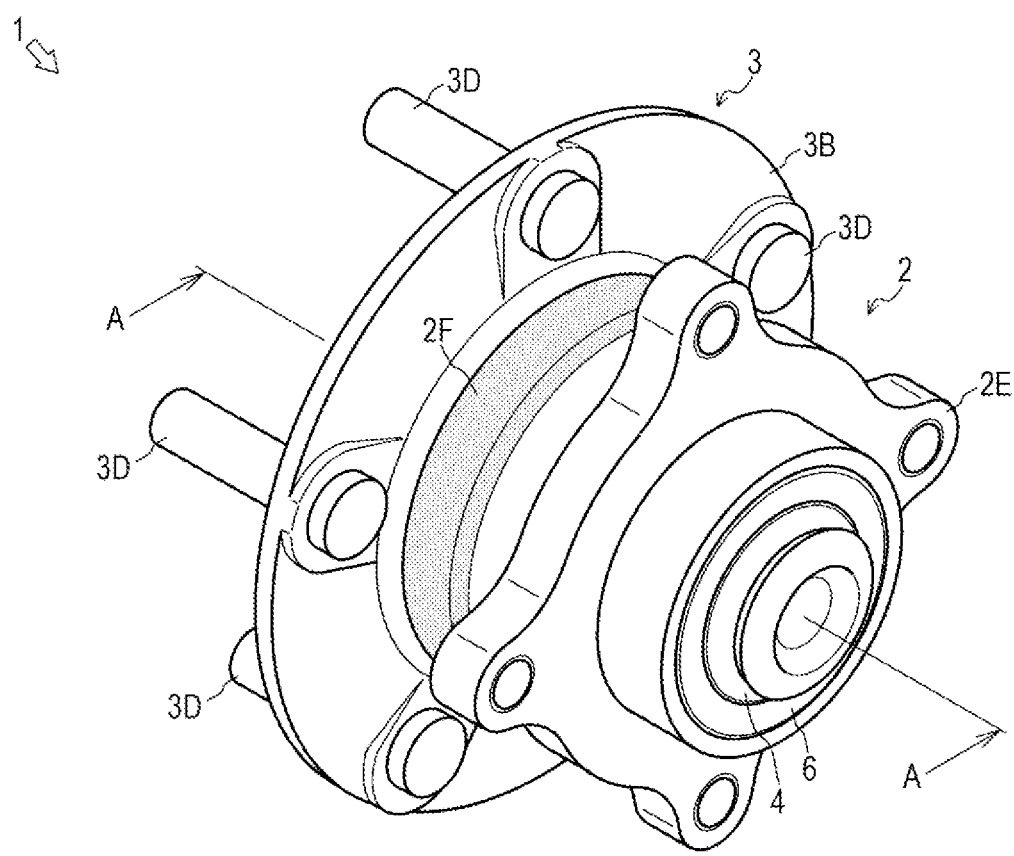
FIG. 1 is a perspective view illustrating an overall configuration of a bearing device for vehicle wheels of a first embodiment.
Figure 2:
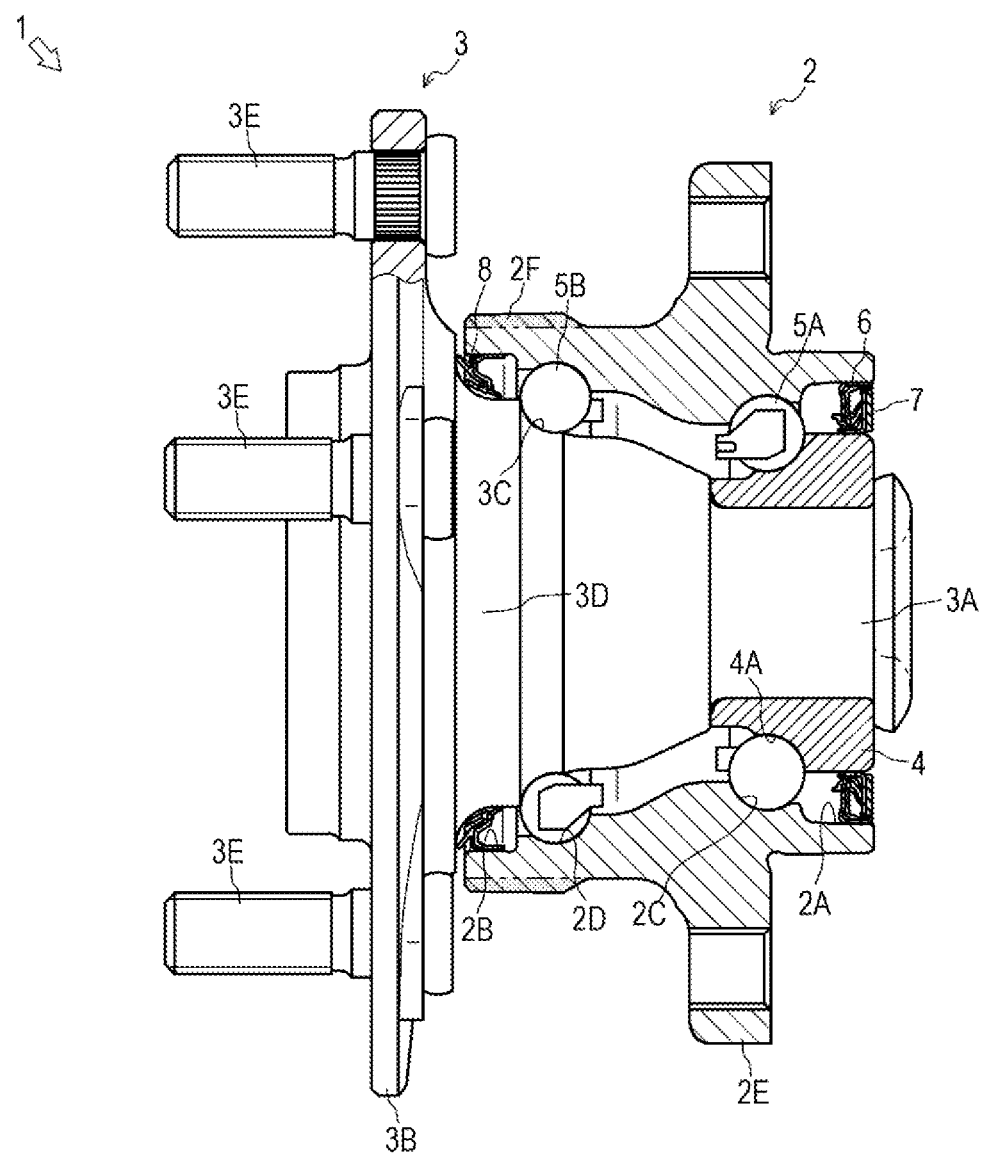
FIG. 2 is a cross-sectional view illustrating the overall configuration of the bearing device for vehicle wheels of the first embodiment (as seen in the direction of arrow A in FIG. 1).

As shown in FIG. 1 and FIG. 2, the bearing device for vehicle wheels 1 rotatably supports a wheel in a suspension device of a vehicle such as an automobile. The bearing device for vehicle wheels 1 includes an outer member 2, a hub ring 3, an inner ring 4, a first-side ball row 5A (see FIG. 2), a second-side ball row 5B (see FIG. 2) as two rows of rolling elements, a first-side (inner side) sealing member 6 (see FIG. 2) and a second-side (outer side) sealing member 8 (see FIG. 2).

As shown in FIG. 2, the outer member 2 supports the inner member (the hub ring 3 and the inner ring 4). The outer member 2 is made of medium-high carbon steel containing 0.40 wt % to 0.80 wt % of carbon such as S53C provided in a substantially cylindrical shape. At a first-side (inner side) tip of the outer member 2, a first-side opening 2A in which the first-side sealing member 6 can be fitted is provided. At a second-side (outer side) tip of the outer member 2, a second-side opening 2B in which the second-side sealing member 8 can be fitted is provided. On an inner peripheral surface of the outer member 2, an annular outer rolling surface 2C on the first-side in which the first-side ball row 5A rolls is provided near the first-side opening 2A. Similarly, on the inner peripheral surface of the outer member 2, an annular outer rolling surface 2D on the second-side (side of the wheel mounting flange 3B to be described later) in which the second-side ball row 5B rolls is provided near the second-side opening 2B. The outer rolling surface 2C on the first-side and the outer rolling surface 2D on the second-side are provided so as to be parallel to each other in a circumferential direction. A pitch circle diameter of the outer rolling surface 2D on the second-side is provided to be larger than a pitch circle diameter of the outer rolling surface 2C on the first-side. The pitch circle diameters of the outer rolling surface 2C on the first-side and the outer rolling surface 2D on the second-side may be configured equally. A hardened layer having a surface hardness of 58 HRC to 64 HRC by induction hardening is provided on the outer rolling surface 2C on the first-side and the outer rolling surface 2D on the second-side. A vehicle body mounting flange 2E for attachment to a knuckle of a suspension device that is not shown is integrally provided on the outer peripheral surface of the first-side of the outer member 2. The first-side surface and the second-side surface, that are mounting surfaces of the vehicle body mounting flange 2E, are subjected to machining process such as cutting process. On the outer peripheral surface of the second-side (the outer side, the side of the wheel mounting flange 3B to be described later) of the outer member 2, an annular thickened portion 2F that is protruded from the end of the second-side opening 2B toward the first-side in the axial direction by a predetermined amount in a radial direction with a predetermined width is integrally provided.

The hub ring 3 configuring the inner member rotatably supports a wheel of a vehicle that is not shown. The hub ring 3 is made of medium-high carbon steel containing 0.40 wt % to 0.80 wt % of carbon such as S53C that is provided in a bottomed cylindrical shape. On a first-side tip (inner side) of the hub ring 3, a small-diameter stepped portion 3A whose diameter is reduced to the outer peripheral surface is provided. On a second-side tip (outer side) of the hub ring 3, a wheel mounting flange 3B for attachment to a wheel is integrally provided. On an outer peripheral surface of the second-side (side of the wheel mounting flange 3B) of the hub ring 3, an annular inner rolling surface 3C and an annular seal sliding surface 3D are provided in the circumferential direction. The wheel mounting flange 3B is provided at a circumferentially equalized position with hub bolts 3E.

The small-diameter stepped portion 3A at a first-side tip of the hub ring 3 is press-fitted with an inner ring 4 configuring an inner member. The inner ring 4 is made of high-carbon chromium bearing steel such as SUJ 2 and hardened in a range of 58 HRC to 64 HRC up to its core portion by the immersion quenching. An annular inner rolling surface 4A is provided on the outer peripheral surface of the inner ring 4 in the circumferential direction. The inner rolling surface 3C of the hub ring 3 is provided so that a pitch circle diameter becomes larger than the inner rolling surface 4A of the inner ring 4. The pitch circle diameters of the inner rolling surface 3C and the inner rolling surface 4A may be equally configured. The inner ring 4 is integrally secured to the first-side tip of the hub ring 3 in a state where a predetermined preload is applied by press-fitting. That is, on the first-side of the hub ring 3, an inner rolling surface 4A is configured by the inner ring 4. The hub ring 3 is hardened to a surface hardness of 58 HRC to 64 HRC by induction hardening from the small-diameter stepped portion 3A on the first-side to the inner rolling surface 3C on the second-side. Thereby, the hub ring 3 has sufficient mechanical strength against rotational bending load applied to the wheel mounting flange 3B, and a durability of the hub ring 3 is improved. The hub ring 3 is arranged so that the inner rolling surface 4A provided on the inner ring 4 at the first-side tip faces the outer rolling surface 2C on the first-side of the outer member 2 and the inner rolling surface 3C provided on the second-side faces the outer rolling surface 2D on the second-side of the outer member 2.

The first-side ball row 5A and the second-side ball row 5B are rolling rows that rotatably support the hub ring 3. In the first-side ball row 5A and the second-side ball row 5B, a plurality of balls serving as rolling elements are annularly held by a cage. The first-side ball row 5A and the second-side ball row 5B are made of high-carbon chromium bearing steel such as SUJ 2 and hardened in the range of 58 HRC to 64 HRC up to the core part by immersion quenching. A second-side ball row 5B is configured so that the pitch circle diameter becomes larger than that of the first-side ball row 5A. The pitch circle diameters of the first-side ball row 5A and the second-side ball row 5B may be configured equally. The first-side ball row 5A is interposed in a rollable manner between the inner rolling surface 4A provided in the inner ring 4 and the outer rolling surface 2C on the first-side of the outer member 2 opposed thereto. The second-side ball row 5B is interposed in a rollable manner between the inner rolling surface 3C provided in the hub ring 3 and the outer rolling surface 2D on the second-side of the outer member 2 opposed thereto. That is, the first-side ball row 5A and the second-side ball row 5B rotatably support the hub ring 3 and the inner ring 4 with respect to the outer member 2. In the bearing device for vehicle wheels 1, a multi-row angular contact ball bearing is configured by the outer member 2, the hub ring 3, the inner ring 4, the first-side ball row 5A, and the second-side ball row 5B. In the present embodiment, a multi-row angular contact ball bearing is configured in the bearing device for vehicle wheels 1, but the present invention is not limited thereto, and may be composed of a multi-row tapered roller bearing or the like.

The first-side (inner side) sealing member 6 blocks a gap between the outer member 2 and the inner ring 4. The first-side sealing member 6 includes a substantially cylindrical sealing plate and a substantially cylindrical slinger. In the first-side sealing member 6, a plurality of first-side sealing lips made of synthetic rubber such as NBR (acrylonitrile-butadiene rubber) are cure-adhered to the sealing plate that is composed of a ferritic stainless-steel plate (such as JIS SUS 430 series) or the like. The slinger is made of a steel plate that is equivalent to the sealing plate. A magnetic encoder 7 is adhered to the outside of the slinger (inner side). In the first-side sealing member 6, the sealing plate is fitted into the first-side opening 2A of the outer member 2 and the slinger is fitted to the inner ring 4 to configure a pack seal thereby. The first-side sealing member 6 is slidable with respect to the slinger by contacting the first-side sealing lips of the sealing plate with the slinger through an oil film. With this, the first-side sealing member 6 prevents leakage of lubricating grease from the inside of the outer member 2 and intrusion of rainwater, dust, and the like from the outside.

The second-side (outer side) sealing member 8 blocks a gap between the outer member 2 and the hub ring 3. The second-side sealing member 8 is provided such that a plurality of second-side sealing lips made of synthetic rubber such as nitrile rubber are integrally joined by cure adhesion to a cored bar having a substantially cylindrical shape. In the second-side sealing member 8, a cylindrical portion is fitted to the second-side opening 2B of the outer member 2 and a plurality of second-side sealing lips are in contact with the seal sliding surface 3D of the hub ring 3. The second-side sealing member 8 is configured to be slidable with respect to the hub ring 3 by the second-side sealing lips coming into contact with the seal sliding surface 3D of the hub ring 3 via an oil film. With this, the second-side sealing member 8 prevents leakage of lubricating grease from the inside of the outer member 2 and intrusion of rainwater, dust, and the like from the outside.

In the bearing device for vehicle wheels 1 as described above, a multi-row angular contact ball bearing is configured by the outer member 2, the hub ring 3, the inner ring 4, the first-side ball row 5A and the second-side ball row 5B, and the hub ring 3 is rotatably supported by the outer member 2 via the first-side ball row 5A and the second-side ball row 5B. Further, in the bearing device for vehicle wheels 1, a gap between the first-side opening 2A of the outer member 2 and the inner ring 4 is blocked by the first-side sealing member 6 and a gap between the second-side opening 2B of the outer member 2 and the hub ring 3 is blocked by the second-side sealing member 8. With this, the bearing device for vehicle wheels 1 is configured so that the hub ring 3 supported by the outer member 2 is rotatable while leakage of lubricating grease from inside and intrusion of rain water or dust from outside are prevented.

Next, a shape of the outer member 2 will be described in detail with reference to FIG. 3. Here, it is assumed that a maximum outer diameter width WA is the width in the axial direction from the second-side tip of the outer member 2 to the position of the maximum outer diameter D of the outer rolling surface 2D of the second-side provided in an annular shape (side of the wheel mounting flange 3B, see FIG. 2) in this embodiment. The maximum outer diameter width WA is the width in the axial direction from the second-side tip of the outer member 2 to the bottom of the outer rolling surface 2D on the second-side that is recessed to the outer peripheral surface side of the outer member 2 among the outer rolling surfaces 2D on the second-side.

Figure 3:
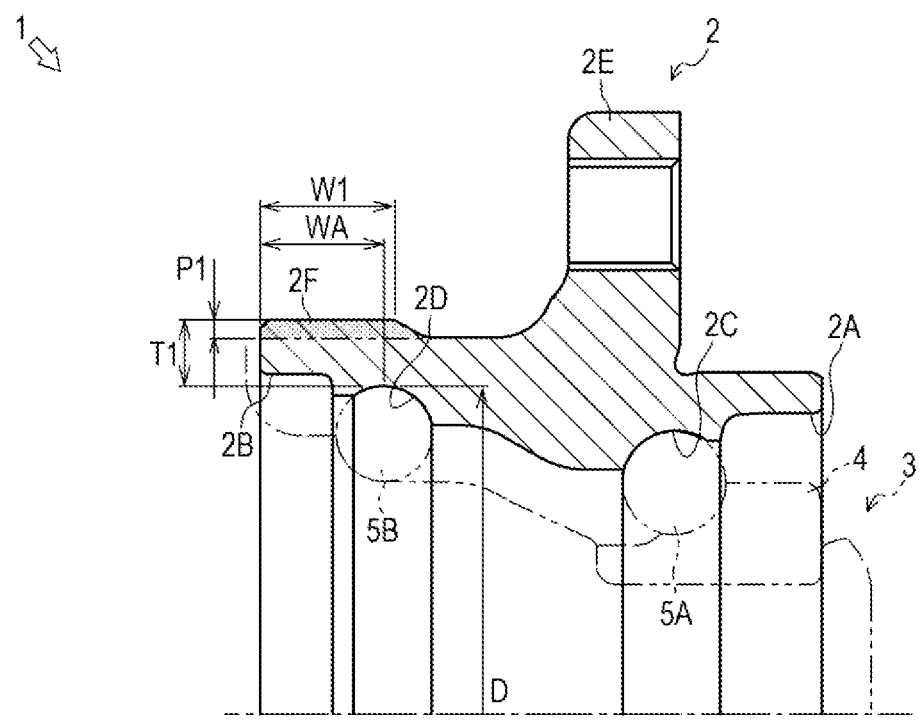
FIG. 3 is an enlarged partial cross-sectional view illustrating a shape of an outer member of the bearing device for vehicle wheels of the first embodiment.

As shown in FIG. 3, on the outer peripheral surface of the outer member 2 provided in a substantially cylindrical shape, near the outer rolling surface 2C on the first-side, the vehicle body mounting flange 2E for mounting to a knuckle of a suspension device that is not shown are provided. In addition, the thickened portion 2F (shaded area) is provided near the outer rolling surface 2D on the second-side of the outer peripheral surface of the outer member 2. The thickened portion 2F is provided in a belt-like shape with a predetermined width W1 protruded by a predetermined protrusion amount P1 in a radial direction from the second-side tip of the outer member 2. The thickened portion 2F is provided entirely over the second-side tip of the outer peripheral surface of the outer member 2 (see the shaded area in FIG. 1 and FIG. 2). The outer peripheral surface of the thickened portion 2F is subjected to a machining process such as a cutting process.

The thickened portion 2F of the outer member 2 is provided to have the width W1 larger than the maximum outer diameter width WA that is the width in the axial direction from the second-side tip of the outer member 2 to the position of the maximum outer diameter D of the outer rolling surface 2D on the second-side (WA<W1). That is, the thickened portion 2F is provided to have the width W1 that overlaps (in a side view in a direction perpendicular to the axial direction of the outer member 2) in the radial direction with the position of the maximum outer diameter D of the outer rolling surface 2D on the second-side of the outer member 2. With this, the thickened portion 2F is provided to cover the bottom portion of the outer rolling surface 2D on the second-side of the outer member 2. In the present embodiment, the thickened portion 2F is provided so as to cover a portion of the outer member 2 that has the smallest thickness among the portions where the outer rolling surface 2D on the second-side is provided. Further, the thickened portion 2F is provided so as to protrude outward in the radial direction by the protrusion amount P1 that is a predetermined amount at which a thickness T1 of the outer member 2 at the position of the maximum outer diameter D of the outer rolling surface 2D on the second-side is equal to or greater than the reference value (for example, about 5 mm to 8 mm). With this, in the outer member 2, the thinnest thickness T1 at the portion where the outer rolling surface 2D on the second-side is provided is equal to or greater than the reference value. In the bearing device for vehicle wheels 1 having such a thickened portion 2F, the roundness deterioration amount of the outer rolling surface 2D on the second-side is improved by about 21% compared with a conventional bearing device for vehicle wheels in which the thickened portion 2F is not provided. As a result, the bearing rolling fatigue life of the bearing device for vehicle wheels 1 in the present embodiment is improved by about 6% as compared with the conventional bearing device for vehicle wheels.

In the bearing device for vehicle wheels 1 as described above, an area of the outer member 2 of the bearing device for vehicle wheels 1 from the first-side tip to the outer rolling surface 2C on the first-side is secured to the knuckle of the vehicle that is not shown via the vehicle body mounting flange 2E, and therefore bearing stiffness above a certain level is ensured for this area. On the other hand, for the area of the width W1 from the second-side tip of the outer member 2 of the bearing device for vehicle wheels 1, bearing stiffness above a certain level is ensured by the thickened portion 2F. Therefore, in the bearing device for vehicle wheels 1, even if the radial load and the axial load increase, the amount of deformation in the range of the width W1 from the second-side tip of the outer member 2 is suppressed. That is, in the bearing device for vehicle wheels 1, deterioration of roundness of the rolling surface of the outer rolling surface 2D due to deformation of the second-side opening 2B of the outer member 2 is suppressed by providing the thickened portion 2F. In addition, in the bearing device for vehicle wheels 1, only the range of the width W1 from the second-side tip of the outer member 2 is covered with the thickened portion 2F. With this, while an increase of an overall weight is minimized, an amount of deformation of the second-side opening 2B of the outer member 2 can be reduced, and deterioration in rolling fatigue life can be prevented.

Figure 4:
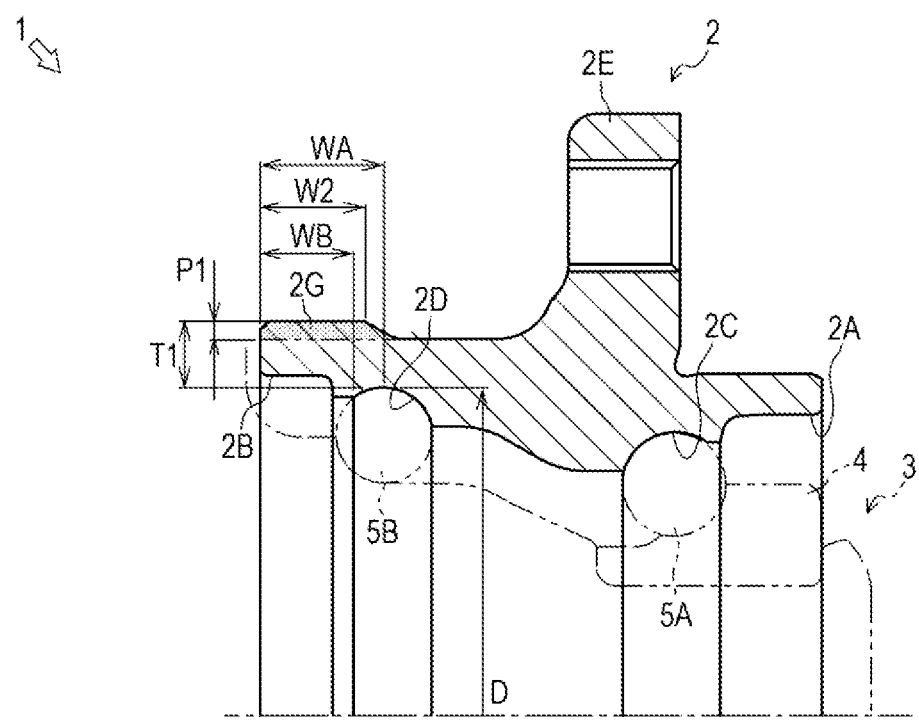
FIG. 4 is an enlarged partial cross-sectional view illustrating a shape of an outer member in another embodiment of the bearing device for vehicle wheels of the first embodiment.

In addition, as another embodiment of the shape of the outer member 2 in the first embodiment, a thickened portion 2G may be provided on the outer member 2 as shown in FIG. 4. Here, the width in the axial direction from the second-side tip of the outer member 2 to an edge on the side of the wheel mounting flange 3B of the outer rolling surface 2D on the second-side is set as an offset width WB. The offset width WB is the width from the second-side tip of the outer member 2 to the portion of the second-side rolling surface 2D that is closest to the second-side tip.

The thickened portion 2G of the outer member 2 is provided to be larger than the offset width WB that is the width in the axial direction from the second-side tip of the outer member 2 to the edge on the side of the wheel mounting flange 3B of the outer rolling surface 2D on the second-side, and to have a width W2 that is equal to or less than the maximum outer diameter width WA, that is the width in the axial direction up to the position of the maximum outer diameter D of the outer rolling surface 2D on the second-side (WB<W2≤WA). That is, the thickened portion 2G is provided to have the width W2 that is overlaps in a radial direction (in a side view in a direction perpendicular to the axial direction of the outer member 2) with a portion of the second-side of the outer rolling surface 2D on the second-side on the outer peripheral surface of the outer member 2. With this, the thickened portion 2G is provided so as to cover a part of a portion where the outer rolling surface 2D on the second-side of the outer member 2 is provided.

Of the outer member 2 of the bearing device for vehicle wheels 1 as described above, with respect to the range that is larger than the offset width WB of the outer rolling surface 2D on the second-side from the second-side tip and is equal to or smaller than the maximum outer diameter width WA, bearing stiffness above a certain level is secured by the thickened portion 2G. Therefore, in the bearing device for vehicle wheels 1, degradation of roundness of the rolling surface of the outer rolling surface 2D due to deformation of the second-side opening 2B of the outer member 2 is suppressed by providing the thickened portion 2G. With this, while an increase of an overall weight is minimized, an amount of deformation of the second-side opening 2B of the outer member 2 can be reduced, and deterioration in rolling fatigue life can be prevented.

Second Embodiment

Next, with reference to FIG. 5, description will be given of a bearing device for vehicle wheels 9 that is a second embodiment of the bearing device for vehicle wheels. The bearing device for vehicle wheels according to the following embodiments are applied in place of the bearing device for vehicle wheels 1 in the bearing device for vehicle wheels 1 shown in FIG. 1 to FIG. 4, and the names used in the description, the same reference numerals and symbols are used to designate the same things, and in the following embodiments, the detailed description of the same points as those of the previously described embodiments will be omitted, and the differences will be mainly described.

Figure 5A:
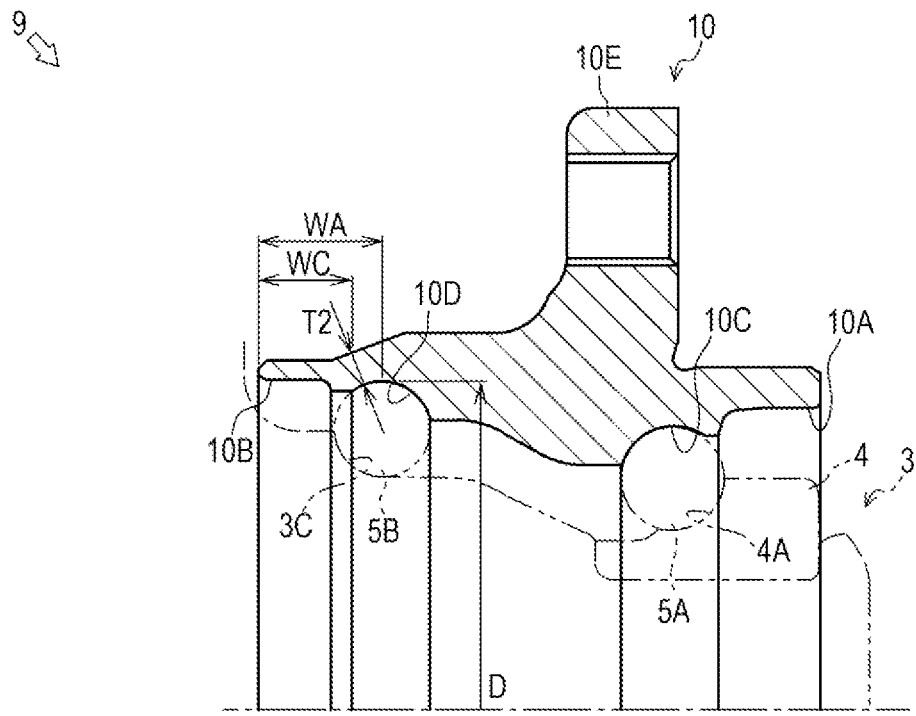
FIG. 5 (A) is a cross-sectional view illustrating an overall configuration of a bearing device for vehicle wheels of a second embodiment before a thickened portion is provided.
Figure 5B:
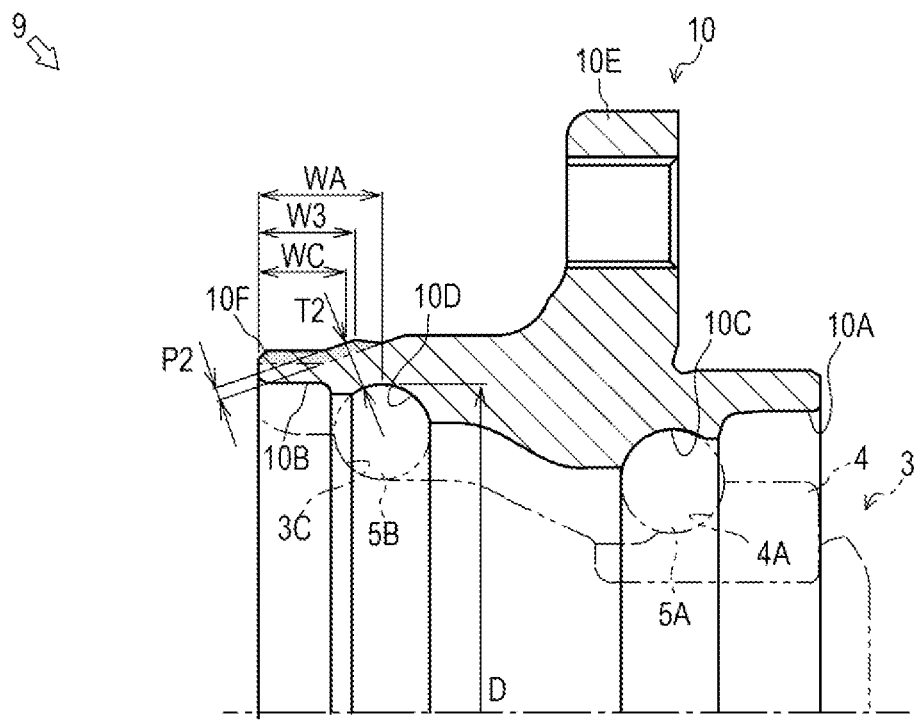

As shown in FIG. 5, a bearing device for vehicle wheels 9 includes the outer member 10, the hub ring 3, the inner ring 4, the first-side ball row 5A, the second-side ball row 5B as two rows of rolling elements, and the like. The outer member 10 has a first side opening 10A and a second side opening 10B. In the bearing device for vehicle wheels 9, the multi-row angular contact ball bearing is configured by the outer member 10, the hub ring 3, the inner ring 4, the first-side ball row 5A, and the second-side ball row 5B. The first-side ball row 5A is in a rollable manner interposed between the inner rolling surface 4A provided in the inner ring 4 and the outer rolling surface 10C on the first-side of the outer member 10 opposed thereto. The second-side ball row 5B is in a rollable manner interposed between the inner rolling surface 3C provided in the hub ring 3 and the outer rolling surface 10D on the second-side of the outer member 10 opposed thereto. That is, the first-side ball row 5A and the second-side ball row 5B rotatably support the hub ring 3 and the inner ring 4 with respect to the outer member 10.

Next, a shape of the outer member 10 will be described in detail. Here, the width in the axial direction from the second-side tip of the outer member 10 to the portion of the outer rolling surface 10D on the second-side closest to the outer peripheral surface of the outer member 10 is defined as a minimum thickness WC. The minimum thickness width WC is the width in the axial direction from the second-side tip of the outer member 10 to the position where the outer member 10 has the thinnest thickness T2 among the outer rolling surfaces 10D on the second-side.

As shown in FIG. 5(A), the outer peripheral surface of the outer member 10 is provided so as to gradually decrease in diameter from the portion overlapping in the radial direction (in side view in the direction perpendicular to the axial direction of the outer member 10) with the outer rolling surface 10D on the second-side toward the second-side tip. With this, in the outer member 10, at the position on the second-side of the position of the maximum outer diameter D of the outer rolling surface 10D on the second-side, a portion having the smallest thickness T2 is provided among the portions where the outer rolling surface 10D on the second-side is provided. In other words, the position of the thinnest thickness T2 of the outer member 10 is provided at the position of the minimum thickness width WC from the second-side tip of the outer member 10.

As shown in FIG. 5 (B), a thickened portion 10F (shaded area) is provided near the outer rolling surface 10D on the second-side of the outer peripheral surface of the outer member 10. The thickened portion 10F of the outer member 10 is provided to have a width W3, that is larger than the minimum thickness width WC that is the width in the axial direction from the second-side tip of the outer member 10 to the thinnest thickness T2 among the portions where the outer rolling surface 10D on the second-side is provided. In other words, the thickened portion 10F is provided to have the width W3 that overlaps the position of the thickness T2 that is the thinnest of the outer rolling surface 10D on the second-side in the radial direction (in a side view in a direction perpendicular to the axial direction of the outer member 10) on the outer peripheral surface of the outer member 10. With this, the thickened portion 10F is provided so as to cover the thinnest portion of the portion where the outer rolling surface 10D on the second-side of the outer member 10 is provided. Further, the thickened portion 10F is provided so as to protrude outward in the radial direction by a protrusion amount P2 that is a predetermined amount at which the thinnest thickness T2 of the outer rolling surface 10D on the second-side is equal to or greater than the reference value (for example, about 5 mm to 8 mm). With this, the thickness T2 of the portion of the outer member 10 that is the thinnest at the outer rolling surface 10D on the second-side from the second-side tip becomes equal to or greater than the reference value.

With respect to the range of the width W3 from the second-side tip of the outer member 10 of the bearing device for vehicle wheels 9 configured thus, bearing stiffness above a certain level is secured by the thickened portion 10F. Accordingly, in the bearing device for vehicle wheels 9, by providing the thickened portion 10F, deterioration of roundness of the rolling surface of the outer rolling surface 10D on the second-side due to deformation of the second-side opening 10B of the outer member 10 is suppressed. With this, while an increase of an overall weight is minimized, an amount of deformation of the second-side opening 10B of the outer member 10 can be reduced, and deterioration in rolling fatigue life can be prevented.

Third Embodiment

Next, with reference to FIG. 6, description will be given of a bearing device for vehicle wheels 11 that is a third embodiment of the bearing device for vehicle wheels.

Figure 6:
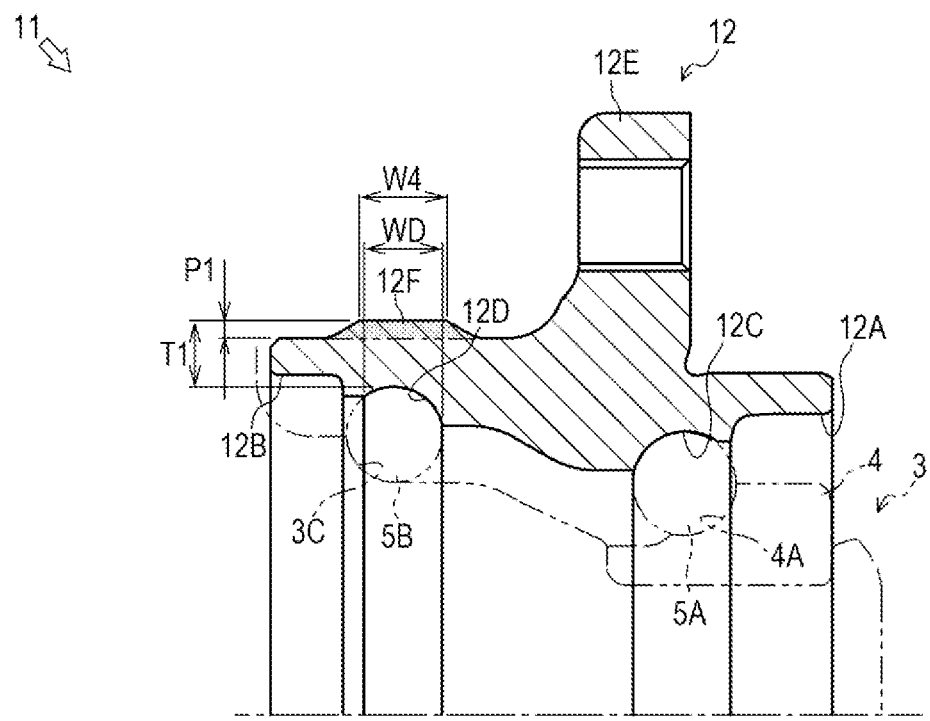
FIG. 6 is an enlarged partial cross-sectional view illustrating a shape of an outer member of a bearing device for vehicle wheels of a third embodiment.

As shown in FIG. 6, a bearing device for vehicle wheels 11 includes an outer member 12, the hub ring 3, the inner ring 4, the first-side ball row 5A, the second-side ball row 5B as two rows of rolling elements, and the like. The outer member 12 has a first side opening 12A and a second side opening 12B. In the bearing device for vehicle wheels 11, a multi-row angular contact ball bearing is configured by the outer member 12, the hub ring 3, the inner ring 4, the first-side ball row 5A, and the second-side ball row 5B. The first-side ball row 5A is in a rollable manner interposed between the inner rolling surface 4A provided in the inner ring 4 and an outer rolling surface 12C on the first-side of the outer member 12 opposed thereto. The second-side ball row 5B is in a rollable manner interposed between the inner rolling surface 3C provided on the hub ring 3 and an outer rolling surface 12D on the second-side of the outer member 12 opposed thereto. That is, the first-side ball row 5A and the second-side ball row 5B rotatably support the hub ring 3 and the inner ring 4 with respect to the outer member 12.

Next, a shape of the outer member 12 will be described in detail. Here, a width in the axial direction from the edge on the first-side (on the side of the vehicle body mounting flange 12E) of the outer rolling surface 12D on the second-side of the outer member 12 to the second-side edge of the outer rolling surface 12D on the second-side is defined as a rolling surface width WD. That is, the rolling surface width WD is the groove width of the outer rolling surface 12D on the second-side.

A thickened portion 12F (shaded area) is provided near the outer rolling surface 12D on the second-side of the outer peripheral surface of the outer member 12. The thickened portion 12F of the outer member 12 is provided to have a width W4 larger than the rolling surface width WD that is the width in the axial direction from the first-side edge to the second-side edge of the second-side outer rolling surface 12D (WD<W4). That is, the thickened portion 12F is provided to have the width W4 that overlaps the outer rolling surface 12D on the second-side on the outer peripheral surface of the outer member 12 in the radial direction (in side view in the direction perpendicular to the axial direction of the outer member 12). With this, the thickened portion 12F is provided so as to cover a portion where the outer rolling surface 12D on the second-side of the outer member 12 is provided.

With respect to the range of the width W4 of the outer member 12 of the bearing device for vehicle wheels 11 configured thus, the thickened portion 12F secures bearing stiffness above a certain level. Therefore, by providing the thickened portion 12F, deterioration of roundness of the rolling surface of the outer rolling surface 12D on the second-side due to deformation of the second-side opening 12B of the outer member 12 is suppressed in the bearing device for vehicle wheels 11. In the bearing device for vehicle wheels 11, only the range of the width W4 from the second-side tip of the outer member 12 is covered with the thickened portion 12F. With this, while an increase of an overall weight is minimized, an amount of deformation of the second-side opening 12B of the outer member 12 can be reduced, and deterioration in rolling fatigue life can be prevented.

Fourth Embodiment

Next, with reference to FIG. 7, description will be given of a bearing device for vehicle wheels 13 that is a fourth embodiment of the bearing device for vehicle wheels.

Figure 7:
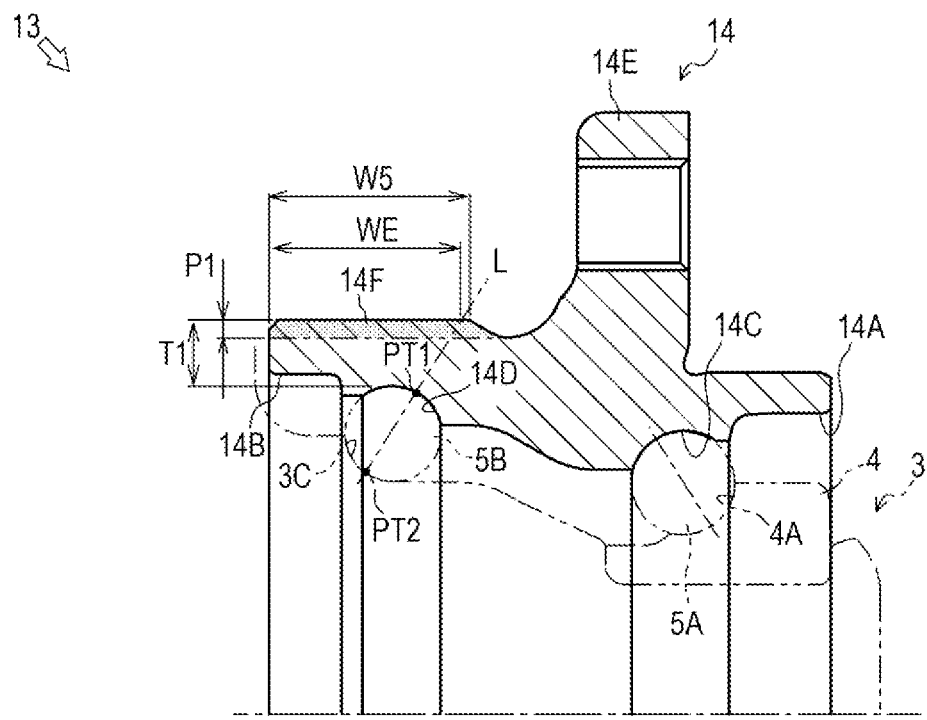
FIG. 7 is an enlarged partial cross-sectional view illustrating a shape of an outer member of a bearing device for vehicle wheels of a fourth embodiment.
Figure 8:
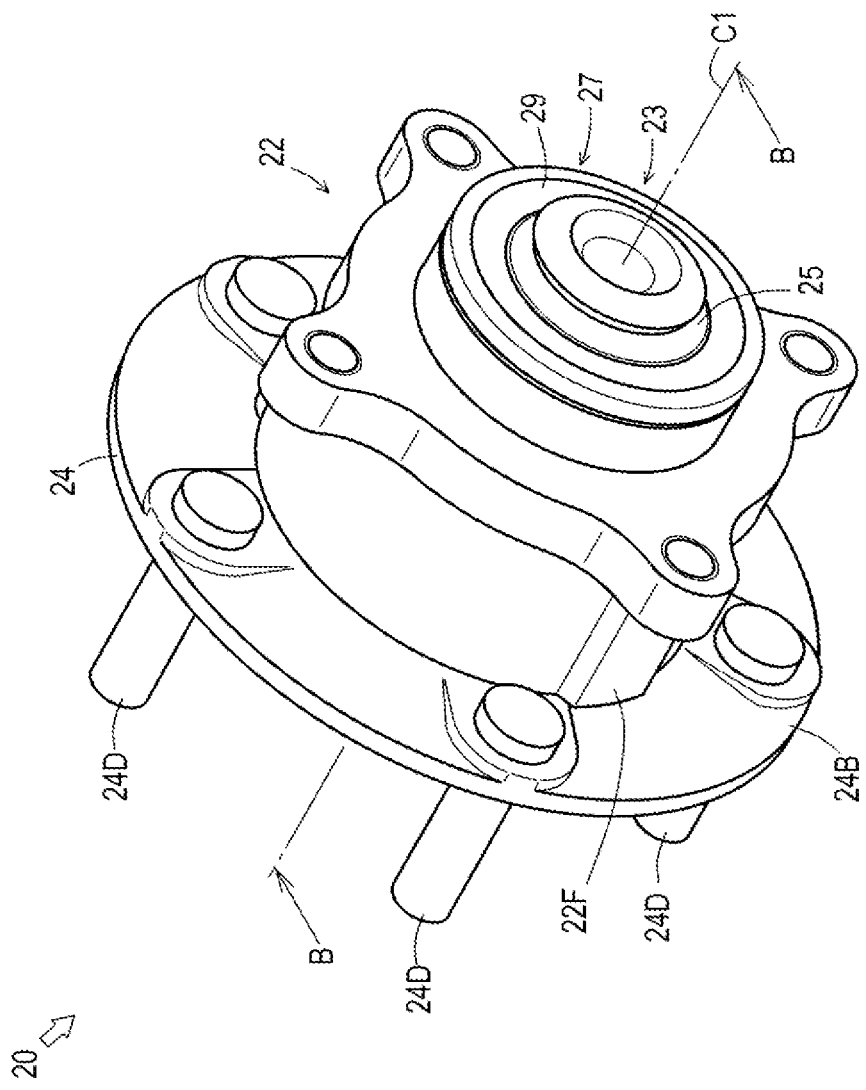
FIG. 8 is a perspective view illustrating the overall configuration of a bearing device for vehicle wheels.

As shown in FIG. 7, the bearing device for vehicle wheels 13 includes an outer member 14, the hub ring 3, the inner ring 4, the first-side ball row 5A, the second-side ball row 5B as two rows of rolling elements, and the like. In the bearing device for vehicle wheels 13, a multi-row angular contact ball bearing is configured by the outer member 14, the hub ring 3, the inner ring 4, the first-side ball row 5A, and the second-side ball row 5B. The outer member 14 includes a first side opening 14A and a second side opening 14B. The first-side ball row 5A is in a rollable manner interposed between the inner rolling surface 4A provided on the inner ring 4 and the outer rolling surface 14C on the first-side of the outer member 14 opposed thereto. The second-side ball row 5B is in a rollable manner interposed between the inner rolling surface 3C provided in the hub ring 3 and the outer rolling surface 14D on the second-side of the outer member 14 opposed thereto. That is, the first-side ball row 5A and the second-side ball row 5B rotatably support the hub ring 3 and the inner ring 4 with respect to the outer member 14.

Next, a shape of the outer member 14 will be described in detail. Here, on the outer rolling surface 14D on the second-side of the outer member 14, a rolling element contact point at which one ball of the second-side ball row 5B that is a rolling element is in contact, is set as an outer contact point PT1. Similarly, on the inner rolling surface 3C of the hub ring 3, a rolling element contact point at which one ball of the second-side ball row 5B that is a rolling element is in contact, is set as an inner contact point PT2. The width from the second-side tip of the outer member 14 to the position where a contact angle line L passing through the outer contact point PT1 and the inner contact point PT2 intersects the outer peripheral surface of the outer member 14 is set as a contact angle width WE. The contact angle line L indicates the direction in which the force applied from the second-side ball row 5B is transmitted to the outer member 14.

A thickened portion 14F (shaded area) is provided near the outer rolling surface 14D on the second-side of the outer peripheral surface of the outer member 14. The thickened portion 14F of the outer member 14 is provided to have a width W5 that is larger than the contact angle width WE that is the width in the axial direction from the second-side tip of the outer member 14 to the position where a contact angle line L intersects the outer peripheral surface (WE<W5). That is, the thickened portion 14F is provided on the outer peripheral surface of the outer member 14 to have the width W5 that overlaps in the radial direction (in a side view in the direction perpendicular to the axial direction of the outer member 14) between the outer rolling surface 14D on the second-side and the contact angle line L. With this, the thickened portion 14F is provided so as to cover a portion where the outer rolling surface 14D on the second-side of the outer member 14 is provided and a portion where the outer member 14 receives a force from the second-side ball row 5B.

With respect to the range of the width W5 of the outer member 14 of the bearing device for vehicle wheels 13 configured thus, bearing stiffness above a certain level is secured by the thickened portion 14F. Accordingly, by providing the thickened portion 14F, the bearing device for vehicle wheels 13 suppresses deterioration of roundness of the rolling surface of the outer rolling surface 14D on the second-side due to deformation of the second-side opening 14B of the outer member 14. Further, in the bearing device for vehicle wheels 13, only the range of the width W5 from the second-side tip of the outer member 14 is covered with the thickened portion 14F. With this, while an increase of an overall weight is minimized, an amount of deformation of the second-side opening 14B of the outer member 14 can be reduced, and deterioration in rolling fatigue life can be prevented.

Although the bearing device for vehicle wheels according to each embodiment has been described as the bearing device for vehicle wheels of a third-generation structure in which the inner rolling surface 3C of the first-side ball row 5A is directly provided on the outer periphery of the hub ring 3, the present invention is not limited to this, but may be applied to a second-generation structure in which a pair of inner rings 4 are press-fitted and secured to the hub ring 3. In addition, the above-described embodiments merely show representative forms of the present invention, and various modifications can be made without departing from the gist of the present invention.

Figure 9:
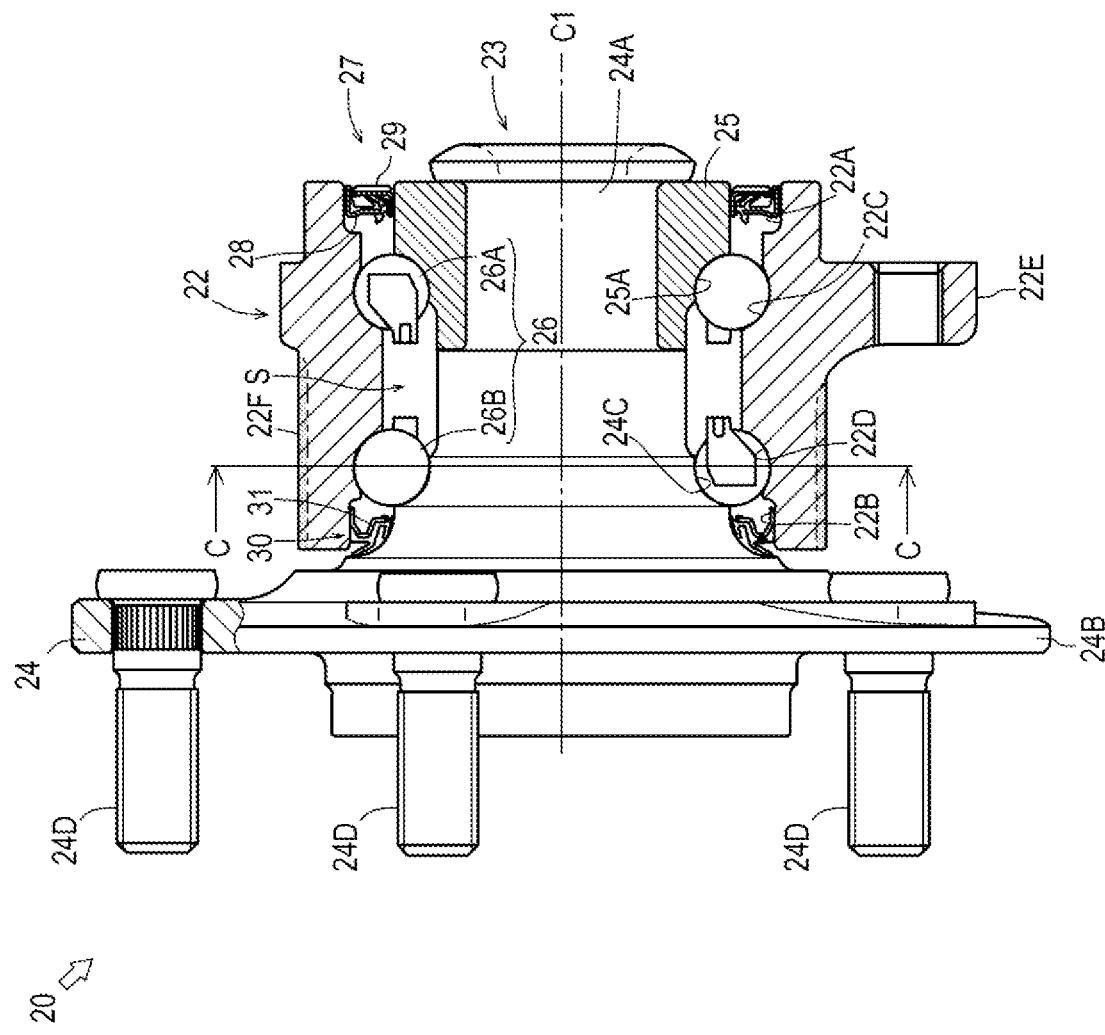
FIG. 9 is a cross-sectional view illustrating an overall configuration of the bearing device for vehicle wheels.
Figure 10:
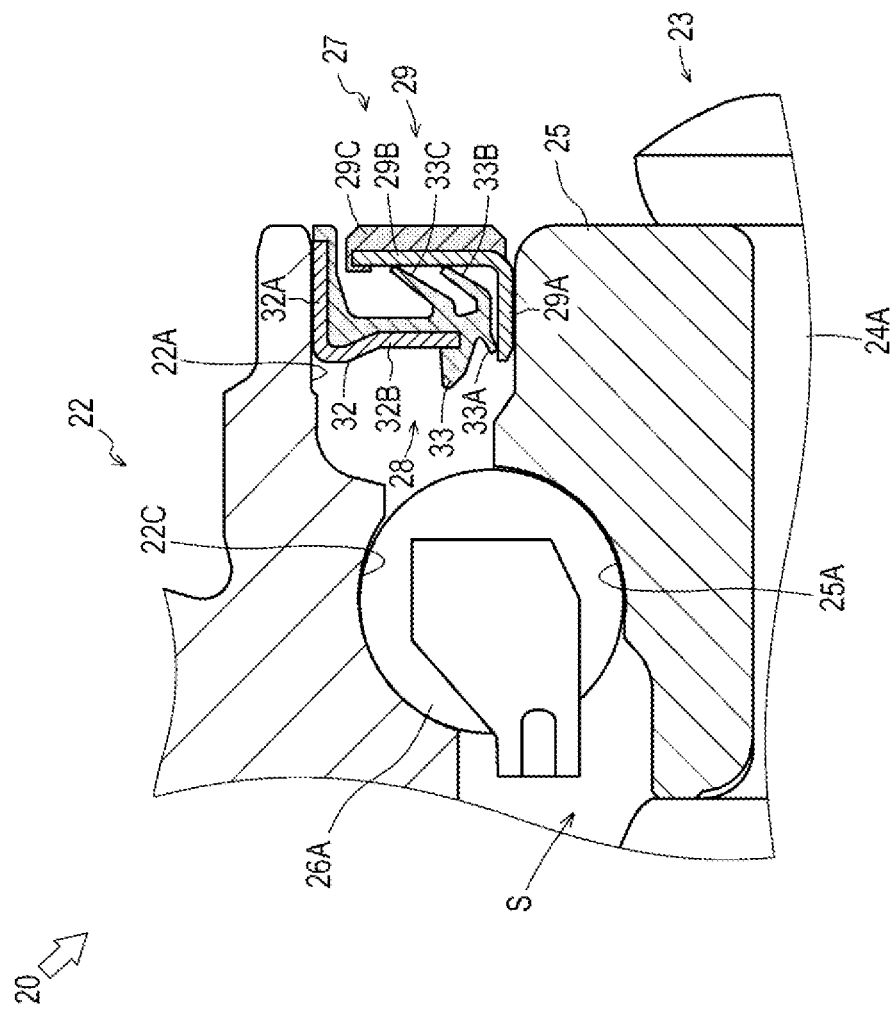
FIG. 10 is an enlarged cross-sectional view illustrating a partial structure of the bearing device for vehicle wheels.
Figure 11:
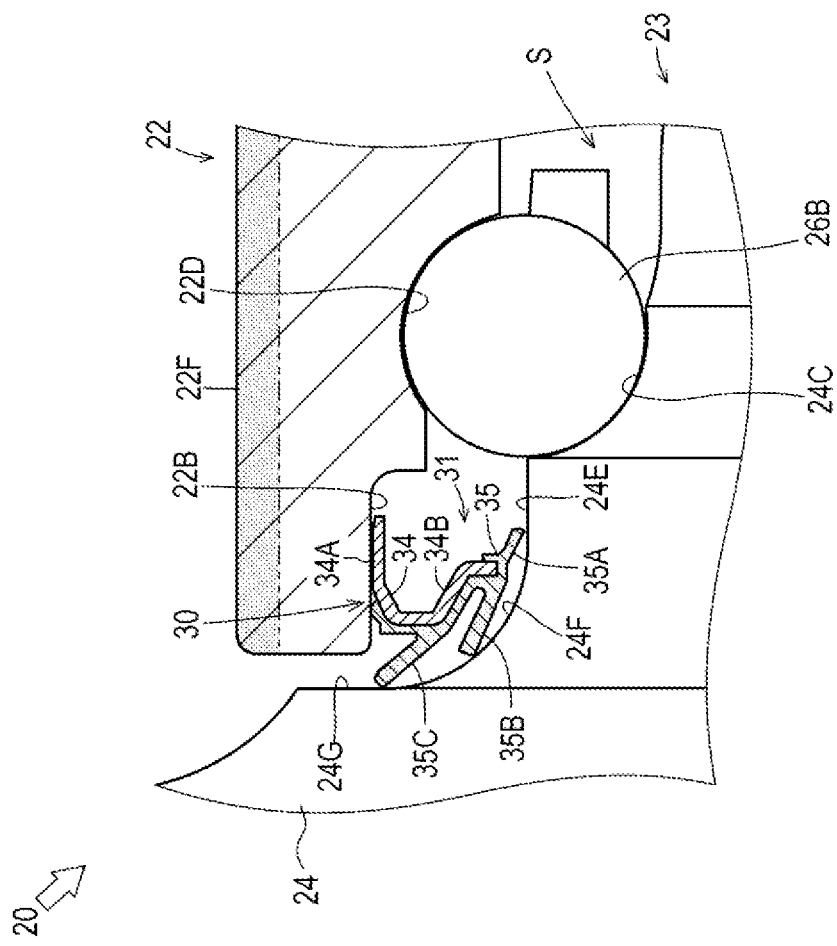
FIG. 11 is an enlarged cross-sectional view illustrating a partial structure of the bearing device for vehicle wheels.

Hereinafter, with reference to FIG. 8 to FIG. 11, a bearing device for vehicle wheels 20 as a fifth embodiment of the bearing device for vehicle wheels according to the present invention will be described. FIG. 9 is a cross sectional view taken along the line B-B in FIG. 8. FIG. 10 and FIG. 11 are enlarged views of a partial region in FIG. 9.

The bearing device for vehicle wheels 20 rotatably supports wheels in a suspension device such as an automobile. The bearing device for vehicle wheels 20 includes an outer member 22, an inner member 23 (a hub ring 24 and an inner ring 25), a rolling element 26, a sealing member 27 (hereinafter referred to as "first-side sealing member 27"), a sealing member 30 (hereinafter referred to as "second-side sealing member 30"). In the following description, "first-side" represents a vehicle body side, that is, the inner side of the bearing device for vehicle wheels 20. Further, "second-side" represents a wheel side, that is, the outer side of the bearing device for vehicle wheels 20.

The outer member 22 supports the inner member 23 (the hub ring 24 and the inner ring 25). The outer member 22 is made of medium-high carbon steel containing 0.40 wt % to 0.80 wt % of carbon such as S53C provided in a substantially cylindrical shape. An enlarged diameter portion 22A is provided at the first-side tip of the outer member 22. An enlarged diameter portion 22B is provided at the second-side tip of the outer member 22. An outer rolling surface 22C and an outer rolling surface 22D are annularly provided so as to be parallel to each other at the inner periphery of the outer member 22. The outer rolling surface 22C and the outer rolling surface 22D are subjected to induction hardening and hardened so that the surface hardness is in the range of 58 HRC to 64 HRC. A knuckle mounting flange 22E for attachment to a knuckle configuring a suspension device is integrally provided on the outer periphery of the outer member 22.

The inner member 23 rotatably supports a wheel that is not shown. The inner member 23 is configured by the hub ring 24 and the inner ring 25.

The hub ring 24 is made of medium-high carbon steel containing 0.40 wt % to 0.80 wt % of carbon such as S53C provided in a bottomed cylindrical shape. A small-diameter stepped portion 24A is provided at the first-side tip of the hub ring 24. The inner ring 25 is press-fitted to the small-diameter stepped portion 24A. A wheel mounting flange 24B is integrally provided at the second-side tip of the hub ring 24. The wheel mounting flange 24B is provided with a hub bolt 24D at an equal cyclotomic position. An inner rolling surface 24C is annularly provided on the outer periphery of the hub ring 24. The hub ring 24 is subjected to induction hardening from the small-diameter stepped portion 24A to the inner rolling surface 24C and hardened so that the surface hardness is in the range of 58 HRC to 64 HRC. With this, the hub ring 24 has sufficient mechanical strength and durability against rotational bending load applied to the wheel mounting flange 24B. The inner rolling surface 24C faces the outer rolling surface 22D of the outer member 22.

The inner ring 25 is made of high-carbon chromium bearing steel such as SUJ 2 provided in a substantially cylindrical shape. On the outer periphery of the inner ring 25, an inner rolling surface 25A is annularly provided. That is, the inner ring 25 is press-fitted into the small-diameter stepped portion 24A of the hub ring 24 and forms the inner rolling surface 25A on the outer periphery of the small-diameter stepped portion 24A. The inner ring 25 is subjected to so-called immersion quenching and hardened so as to be in the range of 58 HRC to 64 HRC to the core portion. With this, the inner ring 25 has sufficient mechanical strength and durability against rotational bending load applied to the wheel mounting flange 24B. The inner rolling surface 25A faces the outer rolling surface 22C of the outer member 22.

The rolling element 26 is interposed between the outer member 22 and the inner member 23 (the hub ring 24 and the inner ring 25). The rolling element 26 has a ball row on the inner side (hereinafter referred to as "first-side ball row 26A") and a ball row on the outer side (hereinafter referred to as "second-side ball row 26B"). The first-side ball row 26A and the second-side ball row 26B are made of high-carbon chromium bearing steel such as SUJ 2. The first-side ball row 26A and the second-side ball row 26B are subjected to so-called immersion quenching and hardened so as to be in the range of 58 HRC to 64 HRC to the core portion. In the first-side ball row 26A, a plurality of balls are annularly held by a cage. The first-side ball row 26A is in a rollable manner disposed between the inner rolling surface 25A provided in the inner ring 25 and the outer rolling surface 22C of the outer member 22 opposed thereto. In the second-side ball row 26B, a plurality of balls are annularly held by a cage. The second-side ball row 26B is in a rollable manner disposed between the inner rolling surface 24C provided on the hub ring 24 and the outer rolling surface 22D of the outer member 22 opposed thereto. In this way, the outer member 22 and the inner member 23 (the hub ring 24 and the inner ring 25) configure a multi-row angular contact ball bearing for the first-side ball row 26A and the second-side ball row 26B. Although the bearing device for vehicle wheels 20 configures a multi-row angular contact ball bearing, it is not limited thereto. For example, multi-row tapered roller bearings and the like may be configured. In addition, although the bearing device for vehicle wheels 20 is a bearing device for vehicle wheels of a third-generation structure in which the inner rolling surface 24C of the second-side ball row 26B is directly provided on the outer periphery of the hub ring 24, the present invention is not limited to this, and it may be a second-generation structure in which a pair of inner rings 25 are press-fitted and secured to the hub ring 24.

The first-side sealing member 27 is attached to the inner-side tip of the annular space S provided between the outer member 22 and the inner member 23. The first-side sealing member 27 is configured by an annular seal ring 28 and an annular slinger 29.

The seal ring 28 is fitted to the enlarged diameter portion 22A of the outer member 22 and is configured integrally with the outer member 22. The seal ring 28 has a cored bar 32 and a seal rubber 33 that is an elastic member.

The cored bar 32 is made of a ferritic stainless-steel plate (JIS standard SUS 430 series or the like), an austenitic stainless-steel plate (JIS standard SUS 304 series or the like), or a rust-proof cold rolled steel plate (JIS standard SPCC series or the like). In the cored bar 32, an annular steel plate is bent by press working, and the cross section in the axial direction is formed in a substantially L shape. Thus, in the cored bar 32, a cylindrical fitting portion 32A and a disk-shaped side plate portion 32B extending from the first-side thereof toward the inner member 23 (inner ring 25) are provided. The fitting portion 32A and the side plate portion 32B intersect substantially perpendicularly to each other, and the fitting portion 32A faces a fitting portion 29A of the slinger 29 described later. Further, the side plate portion 32B faces a side plate portion 29B of the slinger 29 described later. A seal rubber 33, that is an elastic member, is cure-adhered to the fitting portion 32A and the side plate portion 32B.

The seal rubber 33 is made of NBR (acrylonitrile-butadiene rubber), HNBR with excellent heat resistance (hydrogenated acrylonitrile-butadiene rubber), EPDM (ethylene propylene rubber), ACM with excellent heat resistance and chemical resistance (polyacrylic rubber), FKM (fluororubber), or synthetic rubber such as silicone rubber. In the seal rubber 33, a radial lip 33B, an inner axial lip 33B, and an outer axial lip 33C that are sealing lips are provided.

The slinger 29 is fitted to the outer periphery of the inner member 23 (the outer periphery of the inner ring 25) and is configured integrally with the inner member 23.

The slinger 29 is made of a ferritic stainless-steel plate (JIS standard SUS 430 series or the like), an austenitic stainless-steel plate (JIS standard SUS 304 series or the like), or a rust-proof cold rolled steel plate (JIS standard SPCC series or the like). In the slinger 29, an annular steel plate is bent by press working, and the cross section in the axial direction is formed in a substantially L shape. Thus, the slinger 29 is provided with a cylindrical fitting portion 29A and a disk-shaped side plate portion 29B extending from the tip thereof toward the outer member 22. The fitting portion 29A and the side plate portion 29B perpendicularly intersect each other, and the fitting portion 29A faces the fitting portion 32A of the above-described seal ring 28. Further, the side plate portion 29B faces the side plate portion 32B of the above-described seal ring 28. The side plate portion 29B includes a magnetic encoder 29c.

The first-side sealing member 27 is arranged so that the seal ring 28 and the slinger 29 face each other. At this time, the radial lip 33A contacts the fitting portion 29A of the slinger 29 via the oil film. Further, the axial lip 33B contacts the side plate portion 29B of the slinger 29 via the oil film. The outer axial lip 33C also contacts the side plate portion 29B of the slinger 29 via the oil film. In this way, the first-side sealing member 27 configures a so-called pack seal, and prevents intrusion of dust and the like.

The second-side sealing member 30 is attached to the outer-side tip of the annular space S provided between the outer member 22 and the inner member 23. The second-side sealing member 30 is configured by an annular seal ring 31.

The second-side sealing member 30 is configured integrally with the outer member 22 that is fitted to the enlarged-diameter portion 22B of the outer member 22. The seal ring 31 has a cored bar 34 and a seal rubber 35 that is an elastic member.

The cored bar 34 is made of a ferritic stainless-steel plate (JIS standard SUS 430 series or the like), an austenitic stainless-steel plate (JIS standard SUS 304 series or the like), or a rust-proof cold rolled steel plate (JIS standard SPCC series or the like). In the cored bar 34, an annular steel plate is bent by press working, and is formed in a substantially C shape in cross section in the axial direction. As a result, the cored bar 34 has a cylindrical fitting portion 34A and a disk-shaped side plate portion 34B extending from the first-side thereof toward the inner member 23 (the hub ring 24). The fitting portion 34A and the side plate portion 34B intersect each other while being curved, and the fitting portion 34A faces the axial face portion 24E of the hub ring 24. Further, the side plate portion 34B faces the curved surface portion 24F and the side surface portion 24G of the hub ring 24. The seal rubber 35, that is an elastic member, is cure-adhered to the side plate portion 34B.

The seal rubber 35 is made of NBR (acrylonitrile-butadiene rubber), HNBR with excellent heat resistance (hydrogenated acrylonitrile-butadiene rubber), EPDM (ethylene propylene rubber), ACM with excellent heat resistance and chemical resistance (polyacrylic rubber), FKM (fluororubber), or synthetic rubber such as silicone rubber. In the seal rubber 35, a radial lip 35A, an inner axial lip 35B, and an outer axial lip 35C that are sealing lips are provided.

The second-side sealing member 30 is arranged so that the seal ring 31 and the hub ring 24 face each other. At this time, the radial lip 35A contacts the axial surface portion 24G of the hub ring 24 via the oil film. In addition, the inner axial lip 35B contacts the curved surface portion 24F of the hub ring 24 via the oil film. The outer axial lip 35C also contacts the side surface portion 24E of the hub ring 24 via the oil film. In this way, the second-side sealing member 30 prevents intrusion of dust and the like.

Fifth Embodiment

Figure 12:
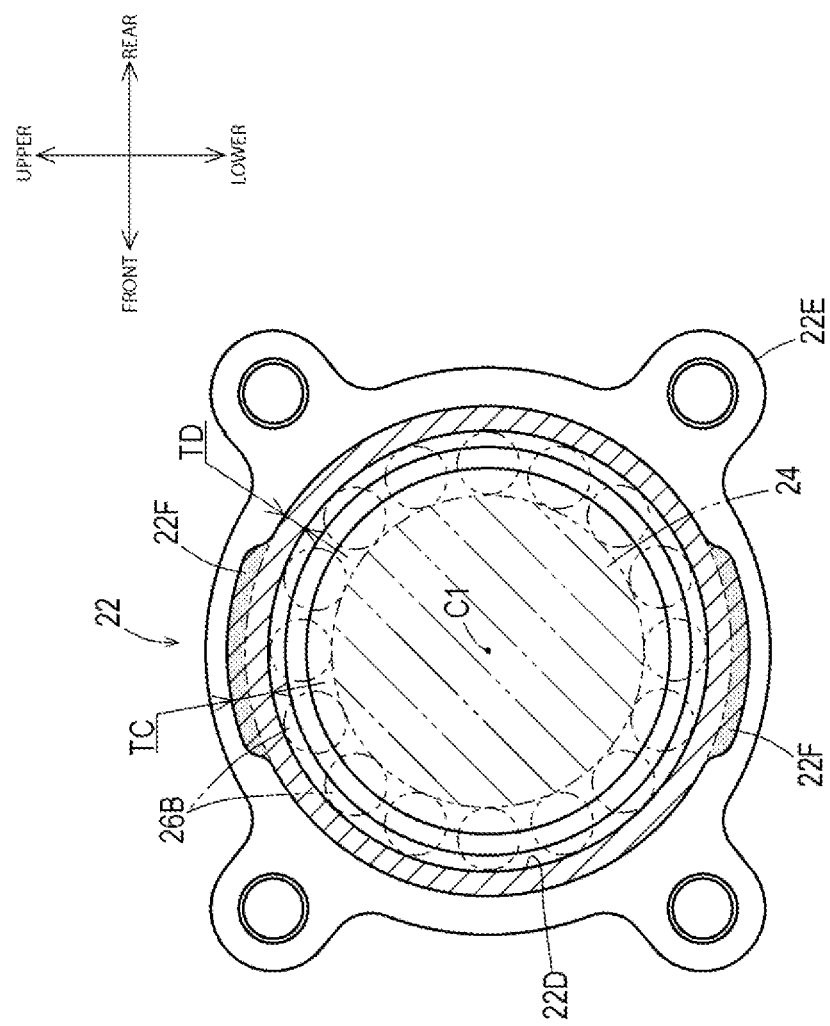
FIG. 12 is a cross-sectional view illustrating a main part structure of a bearing device for vehicle wheels of a fifth embodiment.

Next, a bearing device for vehicle wheels 20 according to a fifth embodiment will be described in detail with reference to FIG. 12. FIG. 12 is a cross-sectional view taken along the line C-C in FIG. 9. It should be noted that FIG. 12 shows a vertical direction and a longitudinal direction of the bearing device for vehicle wheels 20. Here, the vertical direction is a direction parallel to the direction in which gravity acts. Further, the longitudinal direction is a direction orthogonal to the vertical direction, that is, a direction in which a vehicle body moves forward or backward.

In the bearing device for vehicle wheels 20 according to the fifth embodiment, the sectional shape of the outer member 22 is substantially cylindrical with the rotation axis C1 of the inner member 23 as a center. However, the present bearing device for vehicle wheels 20 has two thick portions 22F that protrude in the radial direction from the outer peripheral surface of the outer member 22. A thick portion 22F is provided in parallel with the rotation axis C1 from the outer side end surface of the outer member 22 and extends so as to traverse the outer rolling surface 22D and is connected to the base portion of the knuckle mounting flange 22E (see FIG. 9). Therefore, in the present bearing device for vehicle wheels 20, the thickness dimension of the outer rolling surface 22D provided on the side of the wheel mounting flange 24B (outer side) is unequal at two positions in the circumferential direction. In other words, the thickness dimension of the portion where the outer rolling surface 22D is provided is increased at two positions in the circumferential direction and is not constant. In the present bearing device for vehicle wheels 20, a dimension TC from the inner peripheral surface (outer rolling surface 22D) of the portion where the thick portion 22F is provided to the outer peripheral surface has a value larger than a dimension TD from the inner peripheral surface (outer rolling surface 22D) to the outer peripheral surface in the other portion, and the outer peripheral surface is raised in two positions in the circumferential direction. This feature is performed by providing the thick portion 22F so as to traverse at least the outer rolling surface 22D.

By providing such a design, the present bearing device for vehicle wheels 20 has a simpler shape difference as compared with the conventional bearing device for vehicle wheels, but stiffness of the outer member 22 on the outer side is improved. Therefore, in the present bearing device for vehicle wheels 20, while an increase of an overall weight is minimized, deformation of the outer side opening of the outer member 22 can be reduced and by suppressing deterioration of roundness of the outer rolling surface 22D that is in contact with the ball row 26B, deterioration in rolling fatigue life can be prevented.

In addition, in the present bearing device for vehicle wheels 20, the thick portions 22F are provided at equal intervals concentrically around the rotation axis C1 of the inner member 23. More specifically, the present bearing device for vehicle wheels 20 has two thick portions 22F, and that are provided at a position where the phase angle around the rotation axis C1 is 180°. In the present bearing device for vehicle wheels 20, the thick portions 22F are provided so as to protrude upward and downward.

By providing such a design, the balance of the outer member 22 of the present bearing device for vehicle wheels 20 is improved when it is rotated. Therefore, even when the outer member 22 is rotated during grinding process, center run-out is suppressed. Therefore, in the present bearing device for vehicle wheels 20, the grinding process of the outer member 22 is facilitated, and production efficiency can be enhanced. Further, in the present bearing device for vehicle wheels 20, since the thick portion 22F protruding upward and downward exerts a role as a beam, proof stress is improved mainly against the bending load in the vertical direction.

Sixth Embodiment

Figure 13:
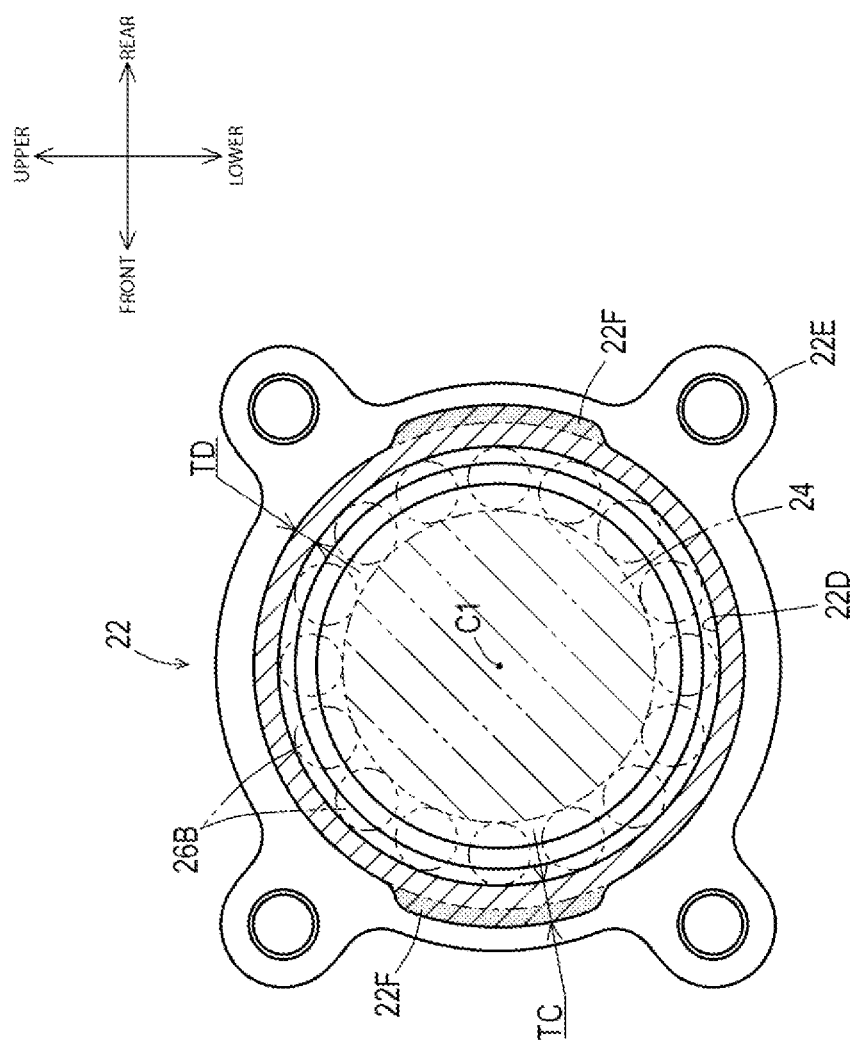
FIG. 13 is a cross-sectional view illustrating a main part structure of a bearing device for vehicle wheels of a sixth embodiment.

Next, the bearing device for vehicle wheels 20 according to a sixth embodiment will be described in detail with reference to FIG. 13. FIG. 13 is a cross-sectional view corresponding to a cross section taken along line C-C in FIG. 9. It should be noted that FIG. 13 also shows the vertical direction and the longitudinal direction of the bearing device for vehicle wheels 20.

Also in the bearing device for vehicle wheels 20 according to the sixth embodiment, the cross-sectional shape of the outer member 22 is substantially cylindrical with the rotation axis C1 of the inner member 23 as a center. Like the bearing device for vehicle wheels 20 according to the fifth embodiment, it has two thick portions 22F. The thick portion 22F is provided in parallel with the rotation axis C1 from the outer side end surface of the outer member 22 and extends so as to traverse the outer rolling surface 22D and is connected to the base portion of the knuckle mounting flange 22E. Therefore, in the present bearing device for vehicle wheels 20, the thickness dimension of the outer rolling surface 22D provided on the side of the wheel mounting flange 24B (outer side) is unequal at two positions in the circumferential direction. That is, the thickness dimension of the portion where the outer rolling surface 22D is provided is increased at two positions in the circumferential direction and is not constant. In the present bearing device for vehicle wheels 20, the dimension TC from the inner peripheral surface (outer rolling surface 22D) of the portion where the thick portion 22F is provided to the outer peripheral surface has a value larger than the dimension TD from the inner peripheral surface (outer rolling surface 22D) to the outer peripheral surface in the other portion, and the outer peripheral surface is raised in two positions in the circumferential direction. This feature is performed by providing the thick portion 22F so as to traverse at least the outer rolling surface 22D.

By providing such a design, the present bearing device for vehicle wheels 20 has a simpler shape difference as compared with the conventional bearing device for vehicle wheels, but stiffness of the outer member 22 on the outer side is improved. Therefore, in the present bearing device for vehicle wheels 20, while an increase of an overall weight is minimized, deformation of the outer side opening of the outer member 22 can be reduced and by suppressing deterioration of roundness of the outer rolling surface 22D that is in contact with the ball row 26B, deterioration in rolling fatigue life can be prevented.

In addition, in the present bearing device for vehicle wheels 20, the thick portions 22F are provided at equal intervals concentrically around the rotation axis C1 of the inner member 23. More specifically, the present bearing device for vehicle wheels 20 has two thick portions 22F, and that are provided at a position where the phase angle around the rotation axis C1 is 180°. In the present bearing device for vehicle wheels 20, the thick portions 22F are provided so as to protrude in the forward direction and the backward direction.

By providing such a design, the balance of the outer member 22 of the present bearing device for vehicle wheels 20 is improved when it is rotated. Therefore, even when the outer member 22 is rotated during grinding process, center run-out is suppressed. Therefore, in the present bearing device for vehicle wheels 20, the grinding process of the outer member 22 is facilitated, and production efficiency can be enhanced. Further, in the present bearing device for vehicle wheels 20, since the thick portion 22F protruding forward direction and backward direction exerts a role as a beam, proof stress is improved mainly against the bending load in the longitudinal direction.

Seventh Embodiment

Figure 14:
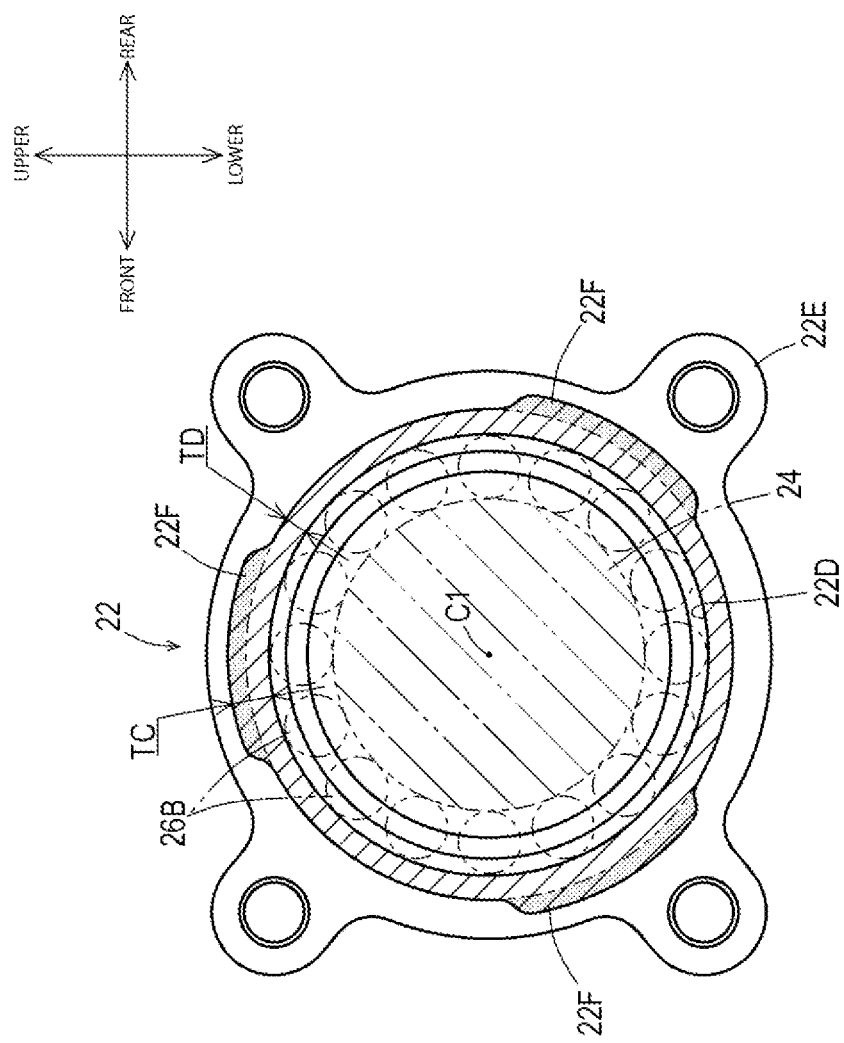
FIG. 14 is a cross-sectional view illustrating a main part structure of a bearing device for vehicle wheels of a seventh embodiment.

Next, the bearing device for vehicle wheels 20 according to a seventh embodiment will be described in detail with reference to FIG. 14. FIG. 14 is a cross-sectional view corresponding to a cross section taken along line C-C in FIG. 9. It should be noted that FIG. 14 also shows the vertical direction and the longitudinal direction of the bearing device for vehicle wheels 20.

Also in the bearing device for vehicle wheels 20 according to the seventh embodiment, the cross-sectional shape of the outer member 22 is substantially cylindrical with the rotation axis C1 of the inner member 23 as a center. Unlike the bearing device for vehicle wheels 20 according to the fifth embodiment or the sixth embodiment, it has three thick portions 22F. The thick portion 22F is provided in parallel with the rotation axis C1 from the outer side end surface of the outer member 22 and extends so as to traverse the outer rolling surface 22D and is connected to the base portion of the knuckle mounting flange 22E. Therefore, in the present bearing device for vehicle wheels 20, the thickness dimension of the outer rolling surface 22D provided on the side of the wheel mounting flange 24B (outer side) is unequal at three positions in the circumferential direction. That is, the thickness dimension of the portion where the outer rolling surface 22D is provided is increased at three positions in the circumferential direction and is not constant. In the present bearing device for vehicle wheels 20, the dimension TC from the inner peripheral surface (outer rolling surface 22D) of the portion where the thick portion 22F is provided to the outer peripheral surface has a value larger than the dimension TD from the inner peripheral surface (outer rolling surface 22D) to the outer peripheral surface in the other portion, and the outer peripheral surface is raised in three positions in the circumferential direction. This feature is performed by providing the thick portion 22F so as to traverse at least the outer rolling surface 22D.

By providing such a design, the present bearing device for vehicle wheels 20 has a simpler shape difference as compared with the conventional bearing device for vehicle wheels, but stiffness of the outer member 22 on the outer side is improved. Therefore, the present bearing device for vehicle wheels 20 reduces the deformation of the outer side opening of the outer member 22 while minimizing the increase of the overall weight and suppresses deterioration of the roundness of the outer rolling surface 22D in contact with the ball row 26B, thereby can prevent the rolling fatigue life from decreasing.

In addition, in the present bearing device for vehicle wheels 20, the thick portions 22F are provided at equal intervals concentrically around the rotation axis C1 of the inner member 23. More specifically, the present bearing device for vehicle wheels 20 has three thick portions 22F, and that are provided at a position where the phase angle around the rotation axis C1 is 120°. In the present bearing device for vehicle wheels 20, the thick portions 22F are provided so as to protrude in the upward direction, the anterior oblique downward direction and the posterior oblique downward direction.

By providing such a design, the balance of the outer member 22 of the present bearing device for vehicle wheels 20 is improved when it is rotated. Therefore, even when the outer member 22 is rotated during grinding process, center run-out is suppressed. Therefore, in the present bearing device for vehicle wheels 20, the grinding process of the outer member 22 is facilitated, and production efficiency can be enhanced. Further, in the present bearing device for vehicle wheels 20, since the thick portion 22F that protrudes in the upward direction, the anterior oblique downward direction and the posterior oblique downward direction exerts a role as a beam, in addition to the vertical direction, proof stress also improves against the bending load in the longitudinal direction.

Eighth Embodiment

Figure 15:
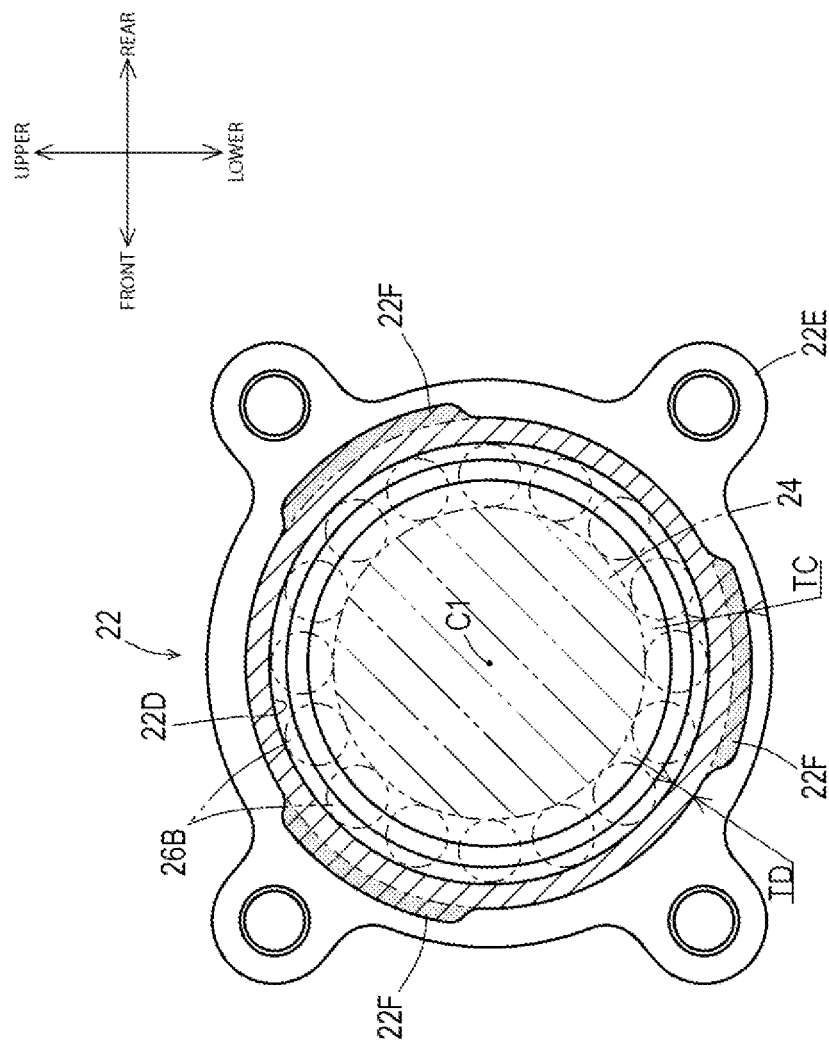
FIG. 15 is a cross-sectional view illustrating a main part structure of a bearing device for vehicle wheels of an eighth embodiment.

Next, the bearing device for vehicle wheels 20 according to an eighth embodiment will be described in detail with reference to FIG. 15. FIG. 15 is a cross-sectional view corresponding to a cross section taken along line C-C in FIG. 9. It should be noted that FIG. 15 also shows the vertical direction and the longitudinal direction of the bearing device for vehicle wheels 20.

Also in the bearing device for vehicle wheels 20 according to the eighth embodiment, the cross-sectional shape of the outer member 22 is substantially cylindrical with the rotation axis C1 of the inner member 23 as a center. Like the bearing device for vehicle wheels 20 according to the seventh embodiment, it has three thick portions 22F. The thick portion 22F is provided in parallel with the rotation axis C1 from the outer side end surface of the outer member 22 and extends so as to traverse the outer rolling surface 22D and is connected to the base portion of the knuckle mounting flange 22E. Therefore, in the present bearing device for vehicle wheels 20, the thickness dimension of the outer rolling surface 22D provided on the side of the wheel mounting flange 24B (outer side) is unequal at three positions in the circumferential direction. That is, the thickness dimension of the portion where the outer rolling surface 22D is provided is increased at three positions in the circumferential direction and is not constant. In the present bearing device for vehicle wheels 20, the dimension TC from the inner peripheral surface (outer rolling surface 22D) of the portion where the thick portion 22F is provided to the outer peripheral surface has a value larger than the dimension TD from the inner peripheral surface (outer rolling surface 22D) to the outer peripheral surface in the other portion, and the outer peripheral surface is raised in three positions in the circumferential direction. This feature is performed by providing the thick portion 22F so as to traverse at least the outer rolling surface 22D.

By providing such a design, the present bearing device for vehicle wheels 20 has a simpler shape difference as compared with the conventional bearing device for vehicle wheels, but stiffness of the outer member 22 on the outer side is improve. Therefore, the present bearing device for vehicle wheels 20 reduces the deformation of the outer side opening of the outer member 22 while minimizing the increase of the overall weight and suppresses deterioration of the roundness of the outer rolling surface 22D in contact with the ball row 26B, thereby can prevent the rolling fatigue life from decreasing.

In addition, in the present bearing device for vehicle wheels 20, the thick portions 22F are provided at equal intervals concentrically around the rotation axis C1 of the inner member 23. More specifically, the present bearing device for vehicle wheels 20 has three thick portions 22F, and that are provided at a position where the phase angle around the rotation axis C1 is 120°. In the present bearing device for vehicle wheels 20, the thick portions 22F are provided so as to protrude in the downward direction, the anterior oblique upward direction and the posterior oblique upward direction.

By providing such a design, the balance of the outer member 22 of the present bearing device for vehicle wheels 20 is improved when it is rotated. Therefore, even when the outer member 22 is rotated during grinding process, center run-out is suppressed. Therefore, in the present bearing device for vehicle wheels 20, the grinding process of the outer member 22 is facilitated, and production efficiency can be enhanced. Further, in the present bearing device for vehicle wheels 20, since the thick portion 22F that protrudes in the downward direction, the anterior oblique upward direction and the posterior oblique upward direction exerts a role as a beam, in addition to the vertical direction, proof stress also improves against the bending load in the longitudinal direction.

Ninth Embodiment

Figure 16:
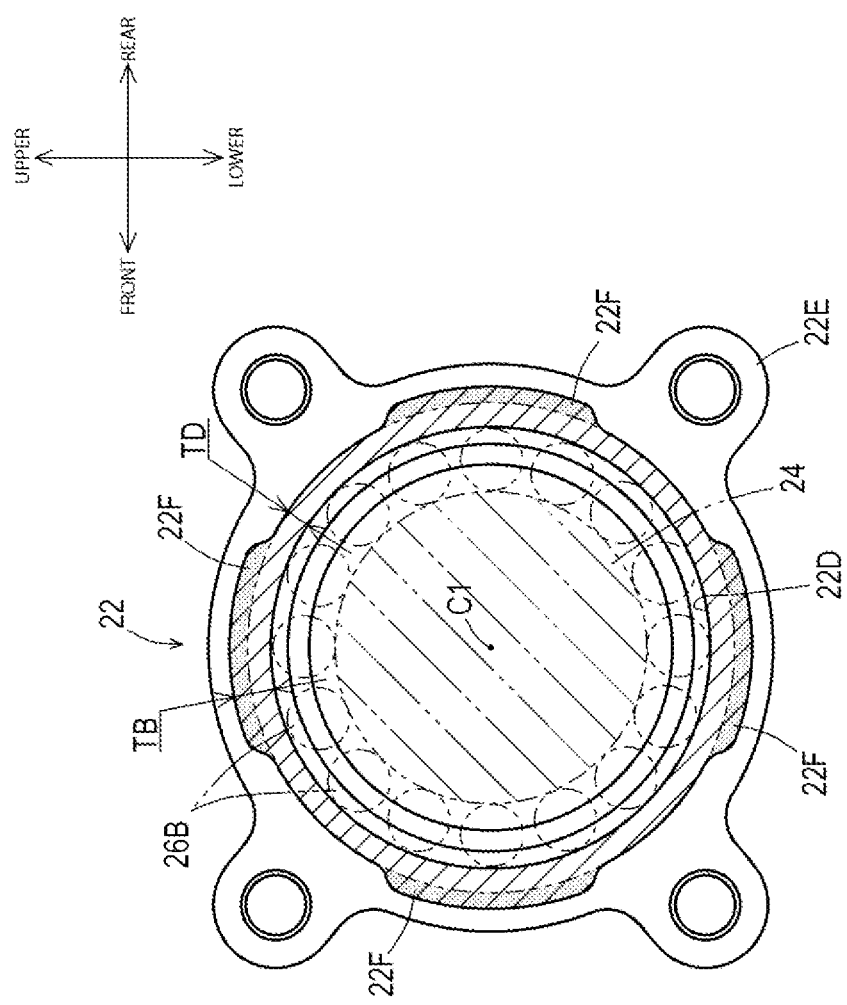
FIG. 16 is a cross-sectional view illustrating a main part structure of a bearing device for vehicle wheels of a ninth embodiment.

Next, the bearing device for vehicle wheels 20 according to a ninth embodiment will be described in detail with reference to FIG. 16. FIG. 16 is a cross-sectional view corresponding to a cross section taken along line C-C in FIG. 9. It should be noted that FIG. 16 also shows the vertical direction and the longitudinal direction of the bearing device for vehicle wheels 20.

Also in the bearing device for vehicle wheels 20 according to the ninth embodiment, the cross-sectional shape of the outer member 22 is substantially cylindrical with the rotation axis C1 of the inner member 23 as a center. Unlike the bearing device for vehicle wheels 20 according to the fifth embodiment to the eighth embodiment, it has four thick portions 22F. The thick portion 22F is provided in parallel with the rotation axis C1 from the outer side end surface of the outer member 22 and extends so as to traverse the outer rolling surface 22D and is connected to the base portion of the knuckle mounting flange 22E. Therefore, in the present bearing device for vehicle wheels 20, the thickness dimension of the outer rolling surface 22D provided on the side of the wheel mounting flange 24B (outer side) is unequal at four positions in the circumferential direction. That is, the thickness dimension of the portion where the outer rolling surface 22D is provided is increased at four positions in the circumferential direction and is not constant. In the present bearing device for vehicle wheels 20, the dimension TC from the inner peripheral surface (outer rolling surface 22D) of the portion where the thick portion 22F is provided to the outer peripheral surface has a value larger than the dimension TD from the inner peripheral surface (outer rolling surface 22D) to the outer peripheral surface in the other portion, and the outer peripheral surface is raised in four positions in the circumferential direction. This feature is performed by providing the thick portion 22F so as to traverse at least the outer rolling surface 22D.

By providing such a design, the present bearing device for vehicle wheels 20 has a simpler shape difference as compared with the conventional bearing device for vehicle wheels, but stiffness of the outer member 22 on the outer side is improved. Therefore, the present bearing device for vehicle wheels 20 reduces the deformation of the outer side opening of the outer member 22 while minimizing the increase of the overall weight and suppresses deterioration of the roundness of the outer rolling surface 22D in contact with the ball row 26B, thereby can prevent the rolling fatigue life from decreasing.

In addition, in the present bearing device for vehicle wheels 20, the thick portions 22F are provided at equal intervals concentrically around the rotation axis C1 of the inner member 23. More specifically, the present bearing device for vehicle wheels 20 has four thick portions 22F, and that are provided at a position where the phase angle around the rotation axis C1 is 90°. In the present bearing device for vehicle wheels 20, the thick portions 22F are provided so as to protrude in the upward direction and downward direction, forward direction and backward direction.

By providing such a design, the balance of the outer member 22 of the present bearing device for vehicle wheels 20 is improved when it is rotated. Therefore, even when the outer member 22 is rotated during grinding process, center run-out is suppressed. Therefore, in the present bearing device for vehicle wheels 20, the grinding process of the outer member 22 is facilitated, and production efficiency can be enhanced. Further, in the present bearing device for vehicle wheels 20, since the thick portion 22F that protrudes in the upward direction and downward direction, forward direction and backward direction exerts a role as a beam, in addition to the vertical direction, proof stress also improves against the bending load in the forward direction and the backward direction.

Tenth Embodiment

Figure 17:
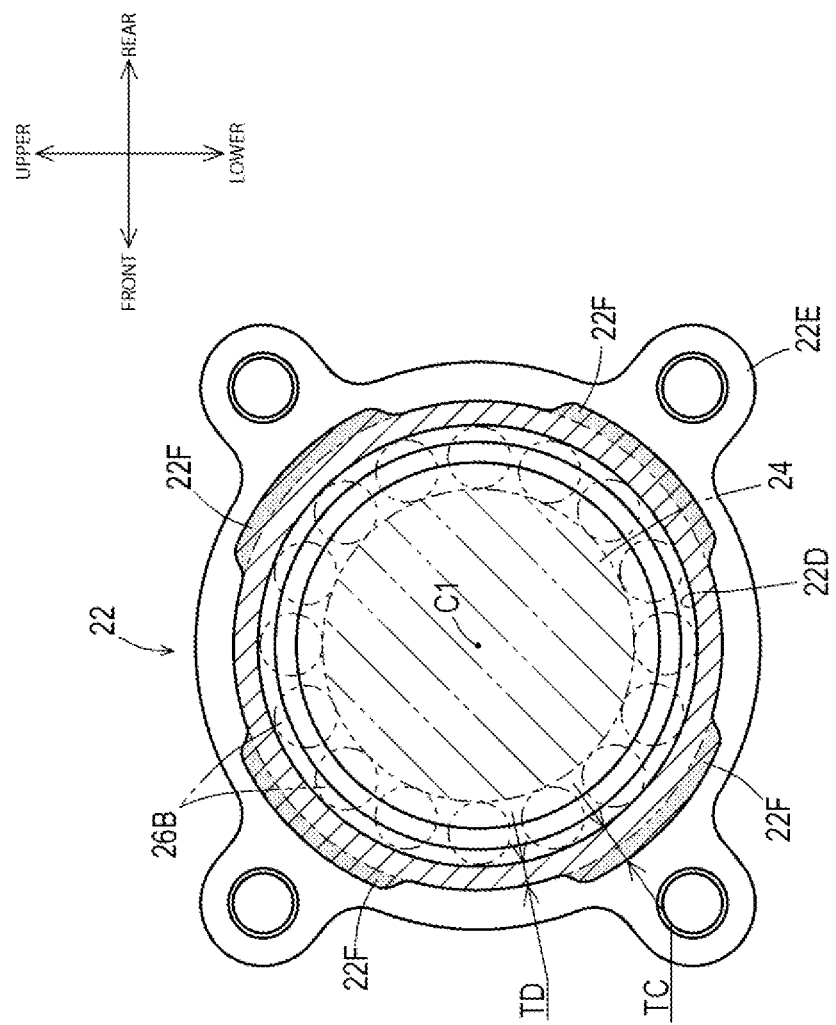
FIG. 17 is a cross-sectional view illustrating a main part structure of a bearing device for vehicle wheels of a tenth embodiment.

Next, the bearing device for vehicle wheels 20 according to a tenth embodiment will be described in detail with reference to FIG. 17. FIG. 17 is a cross-sectional view corresponding to a cross section taken along line C-C in FIG. 9. It should be noted that FIG. 17 also shows the vertical direction and the longitudinal direction of the bearing device for vehicle wheels 20.

Also in the bearing device for vehicle wheels 20 according to the tenth embodiment, the cross-sectional shape of the outer member 22 is substantially cylindrical with the rotation axis C1 of the inner member 23 as a center. Like the bearing device for vehicle wheels 20 according to the ninth embodiment, it has four thick portions 22F. The thick portion 22F is provided in parallel with the rotation axis C1 from the outer side end surface of the outer member 22 and extends so as to traverse the outer rolling surface 22D and is connected to the base portion of the knuckle mounting flange 22E. Therefore, in the present bearing device for vehicle wheels 20, the thickness dimension of the outer rolling surface 22D provided on the side of the wheel mounting flange 24B (outer side) is unequal at four positions in the circumferential direction. That is, the thickness dimension of the portion where the outer rolling surface 22D is provided is increased at four positions in the circumferential direction and is not constant. In the present bearing device for vehicle wheels 20, the dimension TC from the inner peripheral surface (outer rolling surface 22D) of the portion where the thick portion 22F is provided to the outer peripheral surface has a value larger than the dimension TD from the inner peripheral surface (outer rolling surface 22D) to the outer peripheral surface in the other portion, and the outer peripheral surface is raised in four positions in the circumferential direction. This feature is performed by providing the thick portion 22F so as to traverse at least the outer rolling surface 22D.

By providing such a design, the present bearing device for vehicle wheels 20 has a simpler shape difference as compared with the conventional bearing device for vehicle wheels, but stiffness of the outer member 22 on the outer side is improved. Therefore, the present bearing device for vehicle wheels 20 reduces the deformation of the outer side opening of the outer member 22 while minimizing the increase of the overall weight and suppresses deterioration of the roundness of the outer rolling surface 22D in contact with the ball row 26B, thereby can prevent the rolling fatigue life from decreasing.

In addition, in the present bearing device for vehicle wheels 20, the thick portions 22F are provided at equal intervals concentrically around the rotation axis C1 of the inner member 23. More specifically, the present bearing device for vehicle wheels 20 has four thick portions 22F, and that are provided at a position where the phase angle around the rotation axis C1 is 90°. In the present bearing device for vehicle wheels 20, the thick portions 22F are provided so as to protrude in the anterior oblique upward direction and the posterior oblique upward direction, the anterior oblique downward direction and the posterior oblique downward direction.

By providing such a design, the balance of the outer member 22 of the present bearing device for vehicle wheels 20 is improved when it is rotated. Therefore, even when the outer member 22 is rotated during grinding process, center run-out is suppressed. Therefore, in the present bearing device for vehicle wheels 20, the grinding process of the outer member 22 is facilitated, and production efficiency can be enhanced. Further, in the present bearing device for vehicle wheels 20, since the thick portion 22F that protrudes in the anterior oblique upward direction and the posterior oblique upward direction, the anterior oblique downward direction and the posterior oblique downward direction, exerts a role as a beam, in addition to the vertical direction, proof stress also improves against the bending load in the longitudinal direction.

Figure 18A:
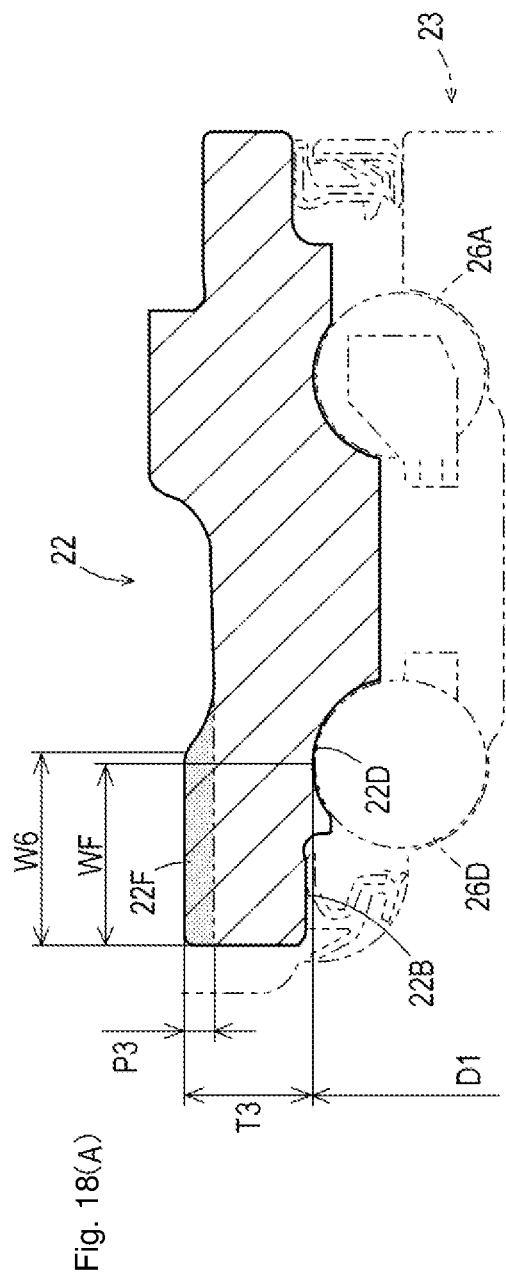
FIG. 18 is a cross-sectional view illustrating a main part structure of a bearing device for vehicle wheels of another embodiment.
Figure 18B:
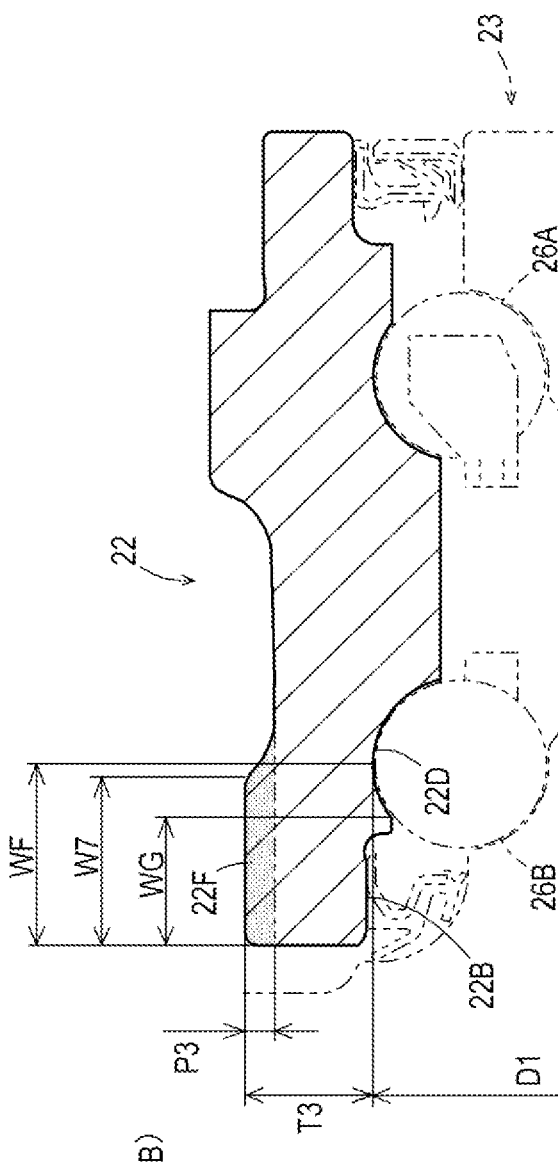
Figure 20:
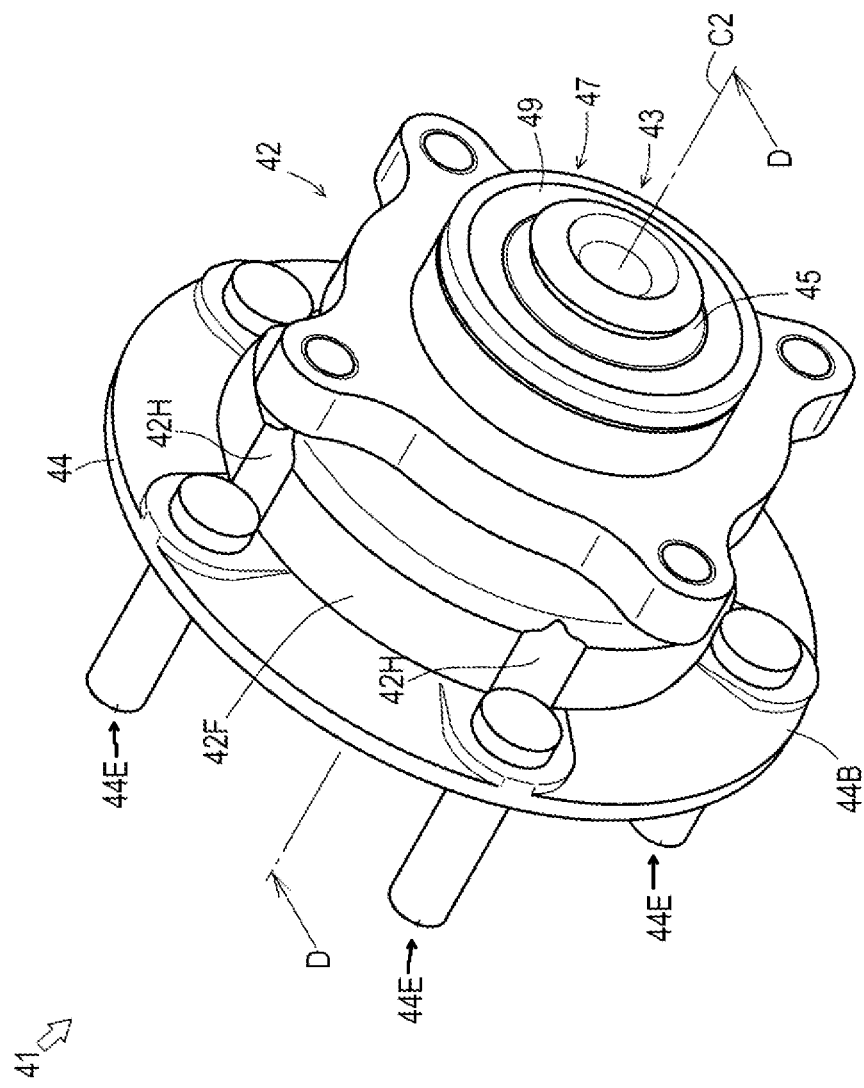
FIG. 20 is a perspective view illustrating an overall configuration of a bearing device for vehicle wheels.

Next, with reference to FIG. 18 and FIG. 19, a structure applicable to the bearing device for vehicle wheels 20 of each of the above-described embodiments will be described. FIG. 18 (A) and FIG. 18 (B) are cross-sectional views illustrating the main part structure in the bearing device for vehicle wheels 20. Also, FIG. 19 (A) and FIG. 19 (B) are cross-sectional views showing the main part structure of the bearing device for vehicle wheels 20.

As shown in FIG. 18 (A), the thick portion 22F is provided from the outer side end surface of the outer member 22 to the outer periphery of the outer rolling surface 22D and a length dimension W6 thereof may be provided to be larger than a length dimension WF from the outer side end surface of the outer member 22 to the position of a maximum outer diameter D1 of the outer rolling surface 22D (W6>WF). That is, the thick portion 22F may be provided so as to cover the position of the maximum outer diameter D1 of the outer rolling surface 22D from the outer-side end surface of the outer member 22. The thick portion 22F protrudes outward in the radial direction by a protrusion amount P3 so that a thickness T3 of the outer member 22 is equal to or greater than the reference value (for example, 5 mm to 8 mm).

Even with such a design, stiffness of the outer member 22 on the outer side is improved in the present bearing device for vehicle wheels 20. Therefore, the present bearing device for vehicle wheels 20 exhibits the same effect as the bearing device for vehicle wheels 20 of each embodiment.

Further, as shown in FIG. 18 (B), the thick portion 22F is provided from the outer side end surface of the outer member 22 to the outer periphery of the outer rolling surface 22D and a length dimension W7 thereof may be provided to have a value that is larger than a length dimension WG from the outer side end surface of the outer member 22 to the outer side edge of the outer rolling surface 22D and is smaller than the length dimension WF from the outer side end surface of the outer member 22 to the position of the maximum outer diameter D1 of the outer rolling surface 22D (WF>W7>WG). In other words, the thick portion 22F may be provided so as to cover a part of the outer periphery of the outer rolling surface 22D from the outer-side end surface of the outer member 22. The thick portion 22F protrudes outward in the radial direction by the protrusion amount P3 so that the thickness T3 of the outer member 22 is equal to or greater than the reference value (for example, 5 mm to 8 mm).

Even with such a design, stiffness of the outer member 22 on the outer side is improved in the present bearing device for vehicle wheels 20. Therefore, the present bearing device for vehicle wheels 20 exhibits the same effect as the bearing device for vehicle wheels 20 of each embodiment.

Further, as shown in FIG. 19 (A), the thick portion 22F is provided so as to surround the outer periphery of the outer rolling surface 22D, and may be provided so that a length dimension W8 thereof is larger than a length dimension WH from the outer side edge to the inner side edge of the outer rolling surface 22D (W8>WH). In other words, the thick portion 22F may be provided so as to cover the outer periphery from the outer-side edge to the inner-side edge of the outer rolling surface 22D. The thick portion 22F protrudes outward in the radial direction by the protrusion amount P3 so that the thickness T3 of the outer member 22 is equal to or greater than the reference value (for example, 5 mm to 8 mm).

Even with such a design, stiffness of the outer member 22 on the outer side is improved in the present bearing device for vehicle wheels 20. Therefore, the present bearing device for vehicle wheels 20 exhibits the same effect as the bearing device for vehicle wheels 20 of each embodiment.

In addition, as shown in FIG. 19 (B), the thick portion 22F is provided from the outer side end surface of the outer member 22 to the inclined portion provided on the outer periphery of the outer rolling surface 22D, and a length dimension W9 thereof may be provided to have a value that is larger than a length dimension WI from the outer side end surface of the outer member 22 to the position where the outer member 22 has the thinnest thickness T3, and is smaller than the length dimension WF from the outer side end surface of the outer member 22 to the position of the maximum outer diameter D1 of the outer rolling surface 22D (WF>W9>WI). That is, the thick portion 22F may be provided so as to cover a part of the inclined portion provided on the outer periphery of the outer raceway surface 22D from the outer side end surface of the outer member 22. The thick portion 22F protrudes outward in the radial direction by the protrusion amount P3 so that the thickness T3 of the outer member 22 is equal to or greater than the reference value (for example, 5 mm to 8 mm).

Even with such a design, stiffness of the outer member 22 on the outer side is improved in the present bearing device for vehicle wheels 20. Therefore, the present bearing device for vehicle wheels 20 exhibits the same effect as the bearing device for vehicle wheels 20 of each embodiment.

Next, items common to the bearing device for vehicle wheels 20 of each of the above-described embodiments will be described.

In the bearing device for vehicle wheels 20 of each embodiment, the outer member 22 is formed by a forging method. Therefore, in the manufacturing process of the outer member 22, the number of processes such as grinding process is reduced. Therefore, the present bearing device for vehicle wheels 20 can be manufactured at low cost.

Eleventh Embodiment

Figure 21:
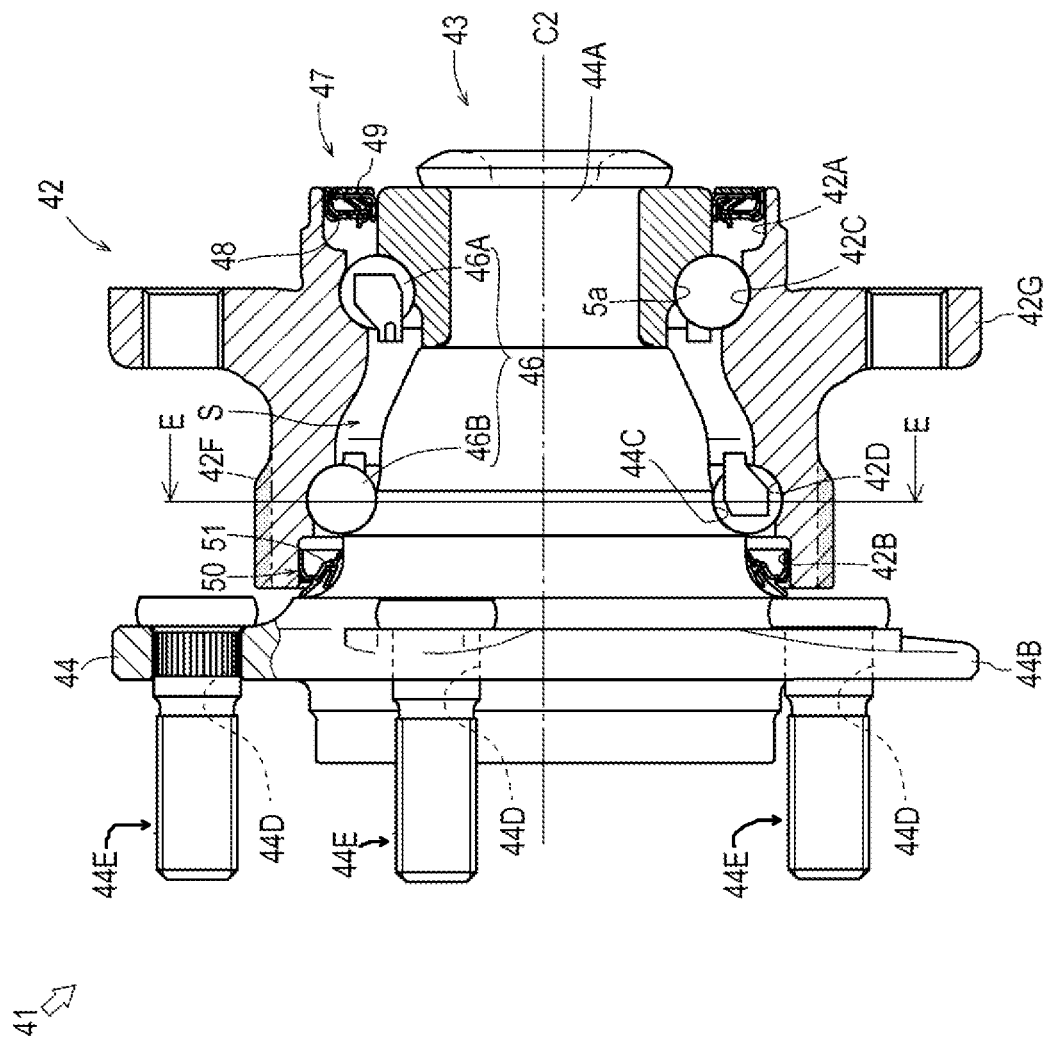
FIG. 21 is a cross-sectional view illustrating the overall configuration of the bearing device for vehicle wheels.
Figure 22:
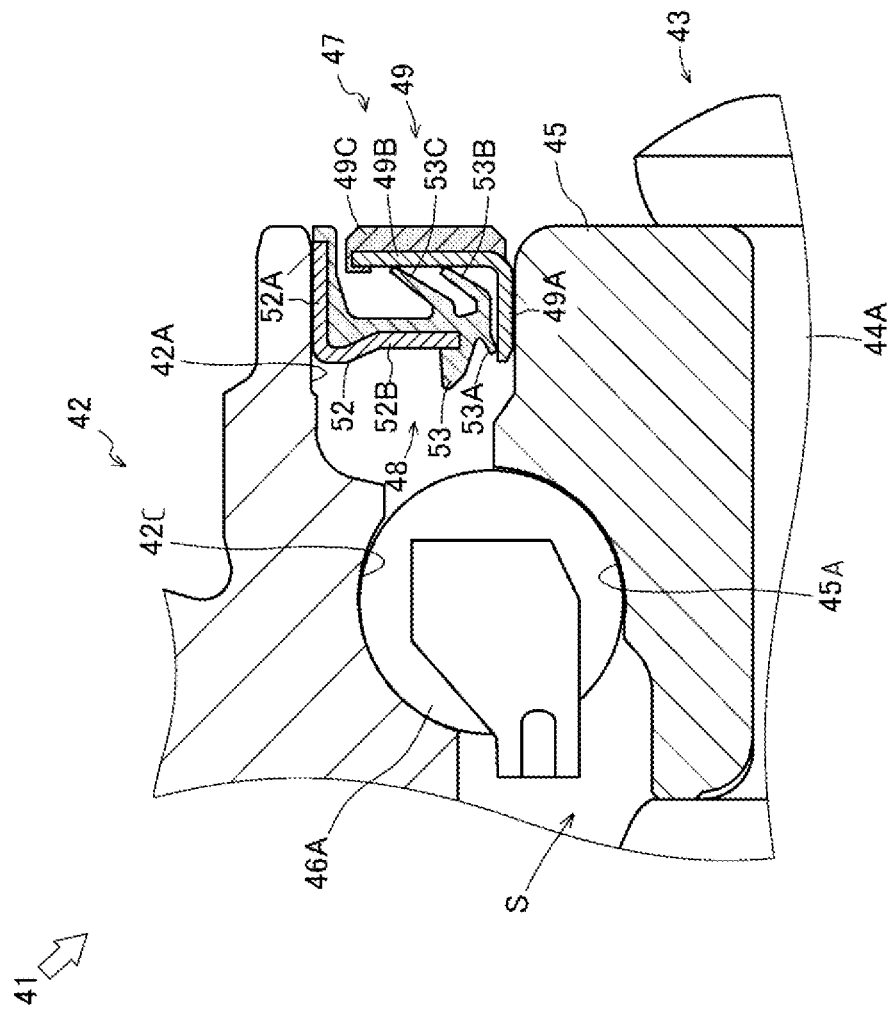
FIG. 22 is an enlarged cross-sectional view illustrating a partial structure of the bearing device for vehicle wheels.
Figure 23:
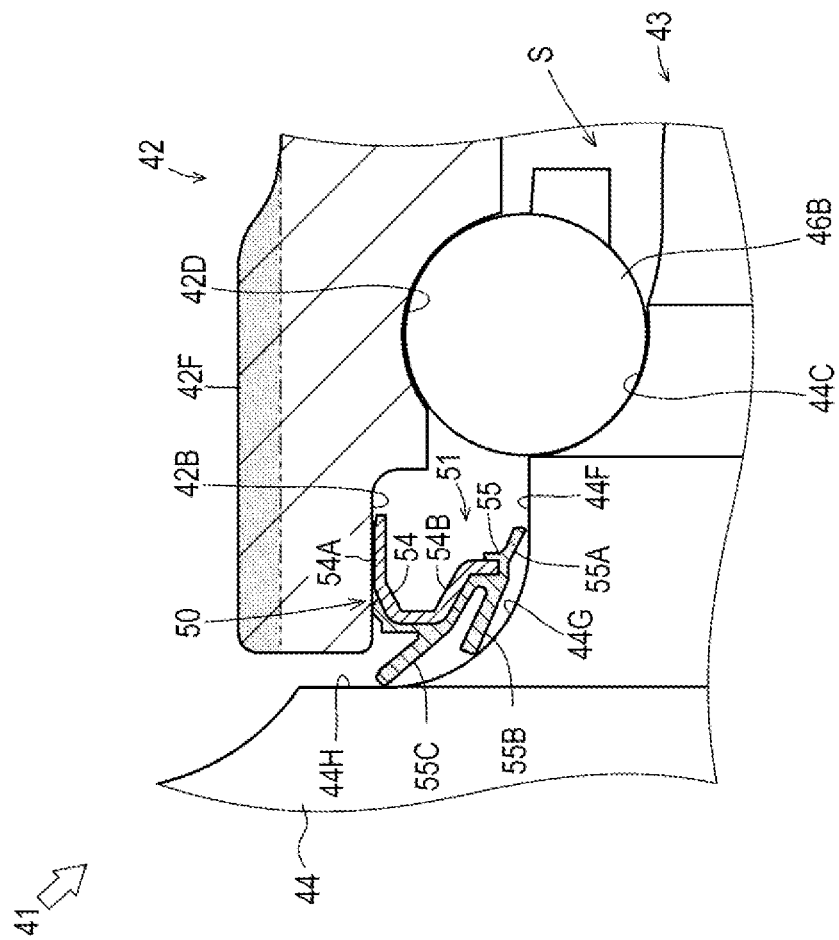
FIG. 23 is an enlarged cross-sectional view illustrating a partial structure of the bearing device for vehicle wheels.

Hereinafter, with reference to FIG. 20 to FIG. 23, a bearing device for vehicle wheels 41 as an eleventh embodiment of the bearing device for vehicle wheels according to the present invention will be described. FIG. 21 is a sectional view taken along the line D-D in FIG. 20. FIG. 22 and FIG. 23 are enlarged views of a partial region in FIG. 21.

The bearing device for vehicle wheels 41 rotatably supports a wheel in a suspension device such as an automobile. The bearing device for vehicle wheels 41 includes an outer member 42, an inner member 43 (a hub ring 44 and an inner ring 45), a rolling element 46, a sealing member 47 (hereinafter referred to as "first-side sealing member 47"), a sealing member 50 (hereinafter referred to as "second-side sealing member 50"). In the following description, "first-side" represents the vehicle body side, that is, the inner side of the bearing device for vehicle wheels 41. The "second-side" represents the wheel side of the bearing device for vehicle wheels 41, that is, the outer side.

The outer member 42 supports the inner member 43 (the hub ring 44 and the inner ring 45). The outer member 42 is made of medium-high carbon steel containing 0.40 wt % to 0.80 wt % of carbon such as S53C provided in a substantially cylindrical shape. An enlarged diameter portion 42A is provided at the first-side tip of the outer member 42. An enlarged diameter portion 42B is provided at the second-side tip of the outer member 42. On the inner periphery of the outer member 42, an outer rolling surface 42C and an outer rolling surface 42D are annularly provided so as to be parallel to each other. The outer rolling surface 42C and the outer rolling surface 42D are subjected to induction hardening and hardened so that the surface hardness is in the range of 58 HRC to 64 HRC. A knuckle mounting flange 42G for attachment to a knuckle configuring a suspension device is integrally provided on the outer periphery of the outer member 42.

The inner member 43 rotatably supports a wheel that is not shown. The inner member 43 is configured by the hub ring 44 and the inner ring 45.

The hub ring 44 is made of medium-high carbon steel containing 0.40 wt % to 0.80 wt % of carbon such as S53C provided into a bottomed cylindrical shape. A small-diameter stepped portion 44A is provided at the first-side tip of the hub ring 44. An inner ring 45 is press-fitted to the small-diameter stepped portion 44A. A wheel mounting flange 44B is integrally provided at the second-side tip of the hub ring 44. In the wheel mounting flange 4B, through-holes 44D are provided at equal intervals concentrically around the rotation axis C2 of the inner member 43, and hub bolts 44E are inserted through the respective through-holes 44D. An inner rolling surface 44C is annularly provided on the outer periphery of the hub ring 44. The hub ring 44 is subjected to induction hardening from the small-diameter stepped portion 44A through the inner rolling surface 44C to the seal land portion (composed of an axial surface portion 44F, a curved surface portion 44G, and a side surface portion 44H described later) and hardened so that the surface hardness is in the range of 58 HRC to 64 HRC. Accordingly, the hub ring 44 has sufficient mechanical strength and durability against rotational bending load applied to the wheel mounting flange 44B. The inner rolling surface 44C faces the outer rolling surface 42D of the outer member 42.

The inner ring 45 is made of high-carbon chromium bearing steel such as SUJ 2 provided in a substantially cylindrical shape. An inner rolling surface 45A is annularly provided on the outer periphery of the inner ring 45. That is, the inner ring 45 is press-fitted in the small-diameter stepped portion 44A of the hub ring 44 and configures the inner rolling surface 45A on the outer periphery of the small-diameter stepped portion 44A. The inner ring 45 is subjected to so-called immersion quenching and hardened so as to be in the range of 58 HRC to 64 HRC to the core portion. With this, the inner ring 45 has sufficient mechanical strength and durability against rotational bending load applied to the wheel mounting flange 44B. The inner rolling surface 45A faces the outer rolling surface 42C of the outer member 42.

The rolling element 46 is interposed between the outer member 42 and the inner member 43 (the hub ring 44 and the inner ring 45). The rolling element 46 has a ball row on the inner side (hereinafter referred to as "first-side ball row 46A") and a ball row on the outer side (hereinafter referred to as "second-side ball row 46B"). The first-side ball row 46A and the second-side ball row 46B are made of high-carbon chromium bearing steel such as SUJ 2. The first-side ball row 46A and the second-side ball row 46B are subjected to so-called immersion quenching and hardened so as to be in the range of 58 HRC to 64 HRC to the core portion. In the first-side ball row 46A, a plurality of balls are annularly held by a cage. The first-side ball row 46A is in a rollable manner disposed between the inner rolling surface 45A provided in the inner ring 45 and the outer rolling surface 42C of the outer member 42 opposed thereto. In the second-side ball row 46B, a plurality of balls are annularly held by a cage. The second-side ball row 46B is in a rollable manner disposed between the inner rolling surface 4C provided in the hub ring 44 and the outer rolling surface 42D of the outer member 42 opposed thereto. In this way, the outer member 42 and the inner member 43 (the hub ring 44 and the inner ring 45) configure a multi-row angular contact ball bearing for the first-side ball row 46A and the second-side ball row 46B. Although the bearing device for vehicle wheels 41 configures with a multi-row angular contact ball bearing, it is not limited thereto. For example, multi-row tapered roller bearings and the like may be configured. In addition, although the bearing device for vehicle wheels 41 is a bearing device for vehicle wheels of a third-generation structure in which the inner rolling surface 4C of the second-side ball row 46B is directly provided on the outer periphery of the hub ring 44, the present invention is not limited to this, it may be a second-generation structure in which a pair of inner rings 45 are press-fitted and secured to the hub ring 44.

The first-side sealing member 47 is attached to the inner side tip of the annular space S provided between the outer member 42 and the inner member 43. The first-side sealing member 47 is configured by an annular seal ring 48 and an annular slinger 49.

The seal ring 48 is fitted to the enlarged diameter portion 42A of the outer member 42 and is configured integrally with the outer member 42. The seal ring 48 has a cored bar 52 and a seal rubber 53 that is an elastic member.

The cored bar 52 is made of a ferritic stainless-steel plate (JIS standard SUS 430 series or the like), an austenitic stainless-steel plate (JIS standard SUS 304 series or the like), or a rust-proof cold rolled steel plate (JIS standard SPCC series or the like). In the cored bar 52, an annular steel plate is bent by press working, and the cross section in the axial direction is formed in a substantially L shape. With this, in the cored bar 52, a cylindrical fitting portion 52A and a disk-shaped side plate portion 52B extending from the first-side thereof toward the inner member 43 (inner ring 45) are provided. The fitting portion 52A and the side plate portion 52B intersect substantially perpendicularly to each other, and the fitting portion 52A faces the fitting portion 49A of the slinger 49 described later. Further, the side plate portion 52B faces the side plate portion 49B of the slinger 49 described later. A seal rubber 53 that is an elastic member is cure-adhered to the fitting portion 52A and the side plate portion 52B.

The seal rubber 53 is made of NBR (acrylonitrile-butadiene rubber), HNBR with excellent heat resistance (hydrogenated acrylonitrile-butadiene rubber), EPDM (ethylene propylene rubber), ACM with excellent heat resistance and chemical resistance (polyacrylic rubber), FKM (fluororubber), or synthetic rubber such as silicone rubber. In the seal rubber 53, a radial lip 53A, an inner axial lip 53B, and an outer axial lip 53C that are sealing lips are provided.

The slinger 49 is fitted to the outer periphery (the outer periphery of the inner ring 45) of the inner member 43 and is configured integrally with the inner member 43.

The slinger 49 is made of a ferritic stainless-steel plate (JIS standard SUS 430 series or the like), an austenitic stainless-steel plate (JIS standard SUS 304 series or the like), or a cold rolled steel plate (JIS standard SPCC series or the like). In the slinger 49, an annular steel plate is bent by press working, and the cross section in the axial direction is formed in a substantially L shape. Thus, the slinger 49 is provided with a cylindrical fitting portion 49A and a disk-shaped side plate portion 49B extending from the tip thereof toward the outer member 42. The fitting portion 49A and the side plate portion 49B perpendicularly intersect each other, and the fitting portion 49A faces the fitting portion 52A of the above-described seal ring 48. Further, the side plate portion 49B faces the side plate portion 52B of the above-described seal ring 48. The side plate portion 49B includes a magnetic encoder 49C.

The first-side sealing member 47 is arranged so that the seal ring 48 and the slinger 49 face each other. At this time, the radial lip 53A contacts the fitting portion 49A of the slinger 49 via the oil film. Further, the inside axial lip 53B contacts the side plate portion 49B of the slinger 49 via the oil film. The outer axial lip 53C also contacts the side plate portion 49B of the slinger 49 via the oil film. In this way, the first-side sealing member 47 configures a so-called pack seal, and prevents intrusion of dust and the like.

The second-side sealing member 50 is attached to the outer-side tip of the annular space S provided between the outer member 42 and the inner member 43. The second-side sealing member 50 is configured by an annular seal ring 51.

The second-side sealing member 50 is fitted to the enlarged-diameter portion 42B of the outer member 42 and is configured integrally with the outer member 42. The sealing ring 51 has a cored bar 54 and a seal rubber 55 that is an elastic member.

The cored bar 54 is made of a ferritic stainless-steel plate (JIS standard SUS 430 series or the like), an austenitic stainless-steel plate (JIS standard SUS 304 series or the like), or a rust-proof cold rolled steel plate (JIS standard SPCC series or the like). In the cored bar 54, an annular steel plate is bent by press working, and is formed in a substantially C shape in cross section in the axial direction. With this, the cored bar 54 has a cylindrical fitting portion 54A and a disk-shaped side plate portion 54B extending from the first-side thereof toward the inner member 43 (the hub ring 44). The fitting portion 54A and the side plate portion 54B intersect each other while being curved, and the fitting portion 54A faces the axial face portion 44F of the hub ring 44. Further, the side plate portion 54B faces the curved surface portion 44G and the side surface portion 44H of the hub ring 44 (that indicates the end surface of the wheel mounting flange 44B). The seal rubber 55 that is an elastic member is cure-adhered to the side plate portion 54B.

The seal rubber 55 is made of NBR (acrylonitrile-butadiene rubber), HNBR with excellent heat resistance (hydrogenated acrylonitrile-butadiene rubber), EPDM (ethylene propylene rubber), ACM with excellent heat resistance and chemical resistance (polyacrylic rubber), FKM (fluororubber), or synthetic rubber such as silicone rubber. In the seal rubber 55, a radial lip 55A, an inner axial lip 55B, and an outer axial lip 55C that are sealing lips are provided.

The second-side sealing member 50 is arranged so that the seal ring 51 and the hub ring 44 face each other. At this time, the radial lip 55A contacts the axial surface portion 44F of the hub ring 44 via the oil film. Further, the axial lip 55B contacts the curved surface portion 44G of the hub ring 44 via the oil film. The outer axial lip 55C also contacts the side surface portion 44H of the hub ring 44 via the oil film. In this way, the second-side sealing member 50 prevents intrusion of dust and the like.

Twelfth Embodiment

Figure 24:
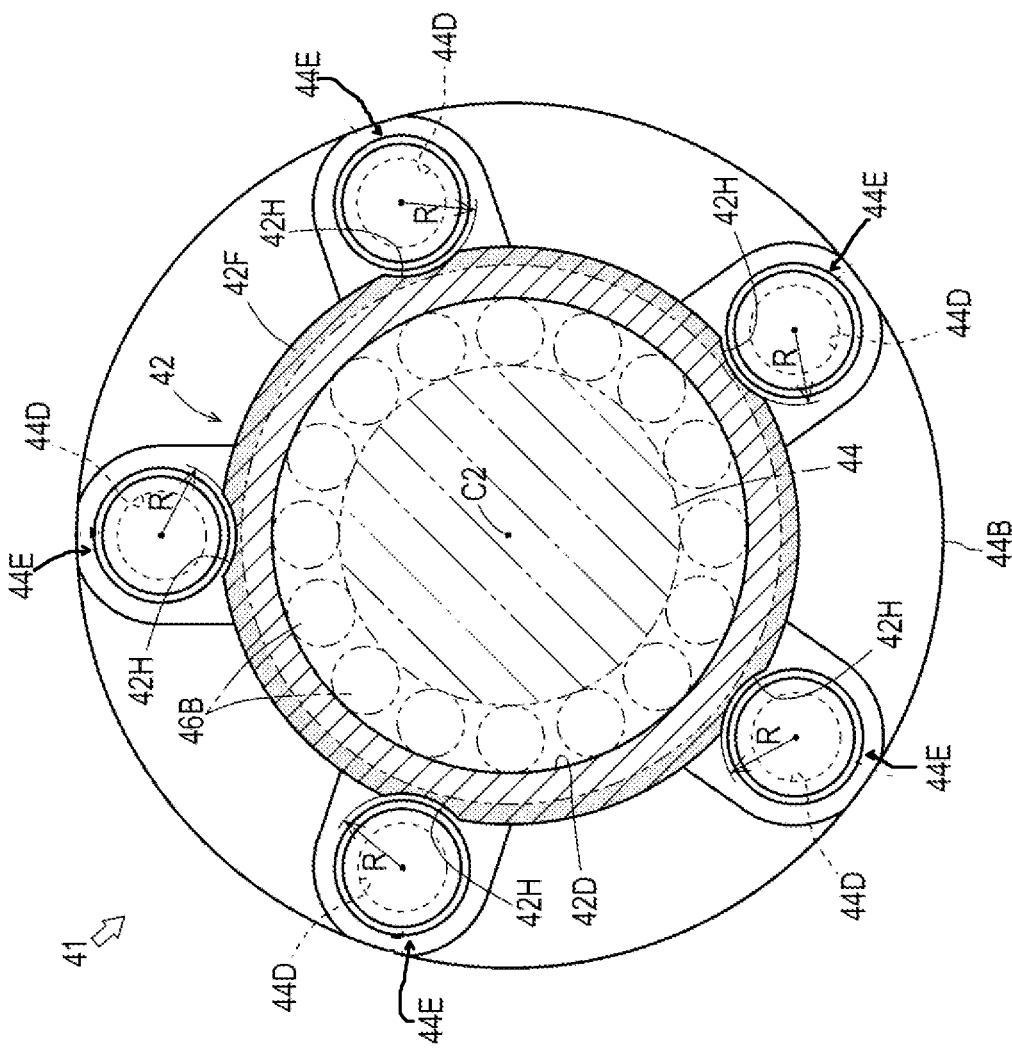
FIG. 24 is a cross-sectional view illustrating a main part structure of a bearing device for vehicle wheels of an eleventh embodiment.
Figure 25:
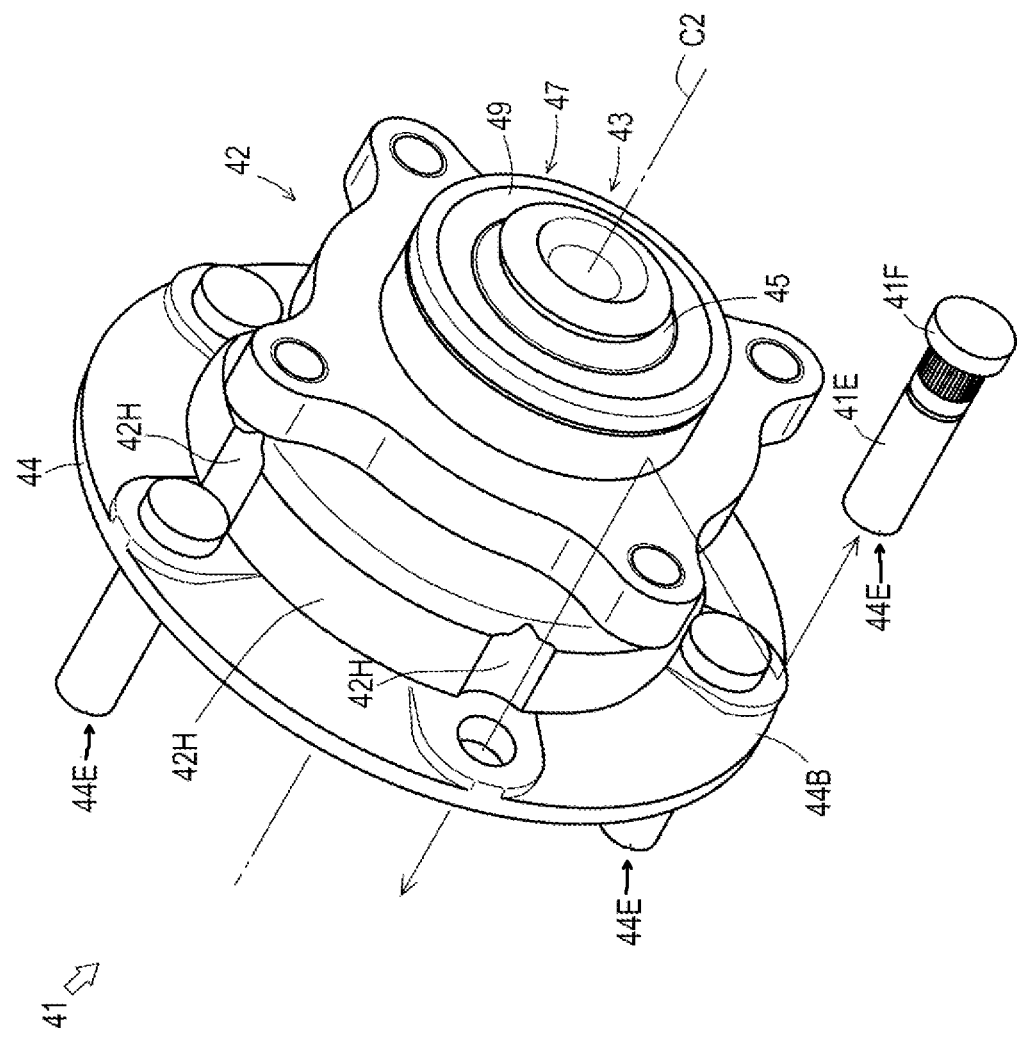
FIG. 25 is a diagram illustrating an exchanging work of a hub bolt.
Figure 26:
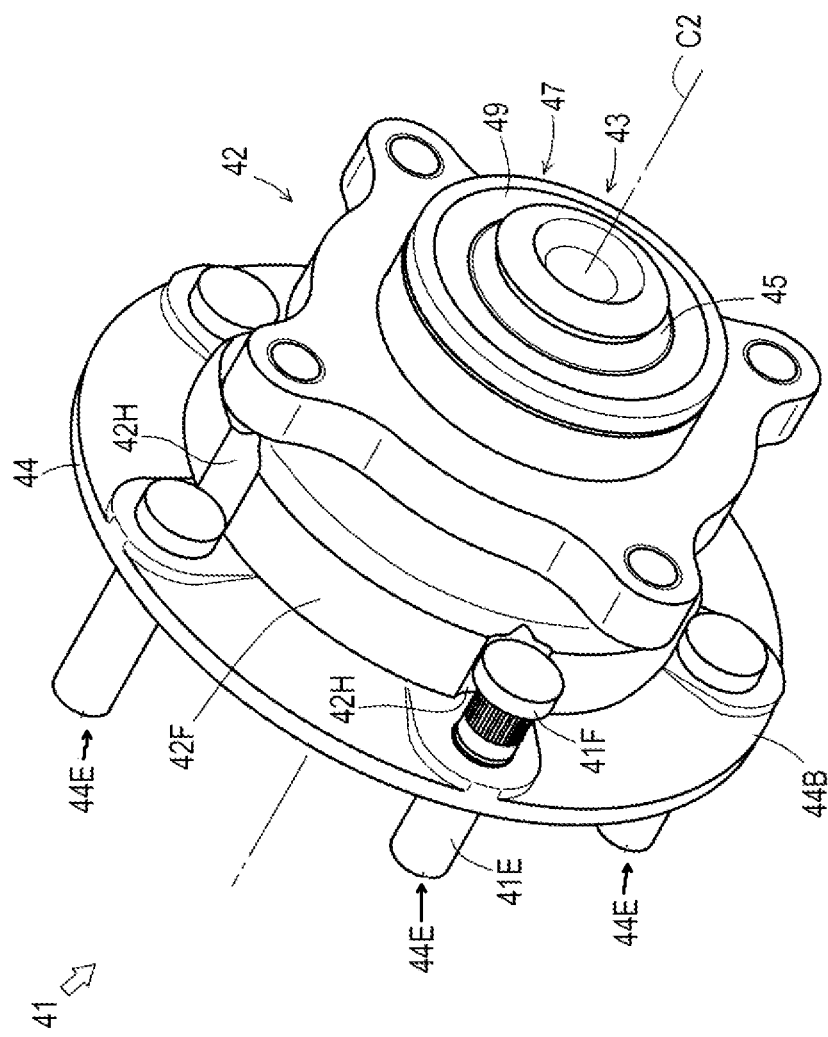
FIG. 26 is a view illustrating a situation in which a guide groove linearly supports the hub bolt.

Next, with reference to FIG. 24 to FIG. 26, the bearing device for vehicle wheels 41 according to a twelfth embodiment will be described in detail. FIG. 24 is a cross-sectional view taken along the line E-E in FIG. 21. FIG. 25 shows an exchanging work of the hub bolt 44E. In addition, FIG. 26 shows a situation in which a guide groove 42H straightly supports a hub bolt 44E.

In the bearing device for vehicle wheels 41 for a wheel according to the twelfth embodiment, the shape of the outer member 42 is substantially cylindrical with the rotation axis C2 of the inner member 43 as a center. In addition, in a present bearing device for vehicle wheels 41, the shape of the cross section of the outer member 42 in the axial direction bulges outwardly at the outer side tip. That is, on the outer-side tip of the outer member 42, a thick portion 42F protruding in the radial direction is provided over the entire circumference. In the present bearing device for vehicle wheels 41, the thick portion 42F is provided from the outer side end surface of the outer member 42 to the position beyond the outer rolling surface 42D in the direction of the rotation axis C2. Therefore, in the present bearing device for vehicle wheels 41, the thickness dimension of the outer rolling surface 42D provided on the outer side is increased over the entire circumference. Therefore, the thickness dimension of the portion where the outer rolling surface 42D is provided is large and constant in the circumferential direction. This feature is performed by providing the thick portion 42F so as to cover at least the portion where the outer rolling surface 42D is provided.

By providing such a design, the present bearing device for vehicle wheels 41 has a simpler shape difference as compared with the conventional bearing device for vehicle wheels, but stiffness of the outer member 42 on the outer side is improved. Therefore, in the present bearing device for vehicle wheels 41, while an increase of an overall weight is minimized, deformation of the outer side opening of the outer member 42 can be reduced and by suppressing deterioration of roundness of the outer rolling surface 42D that is in contact with the ball row 46B, deterioration in rolling fatigue life can be prevented.

Furthermore, in the present bearing device for vehicle wheels 41, the guide groove 42H of the hub bolt 44E provided in parallel with the rotation axis C2 is provided in the thick portion 42F. In detail, in the present bearing device for vehicle wheels 41, a part of the thick portion 42F is recessed inward and is a guide groove 42H of the hub bolt 44E provided in parallel to the rotational axis C2. The thick portion 42F and the guide groove 42H are provided, for example, by a forging method. Therefore, a bearing device for vehicle wheels 40 can be manufactured at low cost.

By providing such a design, the bearing device for vehicle wheels 41 can attach and detach the hub bolt 44E through the guide groove 42H while the thick portion 42F is provided at the outer side tip of the outer member 42 (See FIG. 25). Therefore, in the present bearing device for vehicle wheels 41, it is possible to replace the hub bolt 44E without disassembling the outer member 42 and the inner member 43, so that maintainability can be improved.

In addition, the guide groove 42H is designed to have a predetermined shape. More specifically, the guide groove 42H has an arcuate shape centered on the through hole 44D, and a radius R thereof is substantially the same (similar or somewhat larger) as the radius of the head portion 41F configuring the hub bolt 44E. Therefore, when the screw portion 41E configuring the hub bolt 44E passes through the through hole 44D, the guide groove 42H is in the circumferential direction along, and is in contact with the outer peripheral surface of the head portion 41F configuring the hub bolt 44E. Therefore, when the hub bolt 44E is removed, pushing the screw portion 41E of the hub bolt 44E by a press machine can pull straight along the guide groove 42H (see FIG. 26). Further, when the hub bolt 44E is attached, tightening the thread portion 41E of the hub bolt 44E with a nut or the like can straightly insert along the guide groove 42H (see FIG. 26).

By providing such a design, in the present bearing device for vehicle wheels 41, since the guide groove 42H straightly supports the hub bolt 44E, the exchanging work of the hub bolt 44E is facilitated, and further maintainability can be improved.

In the present bearing device for vehicle wheels 41, the hub bolts 44E are provided at equal intervals concentrically around the rotation axis C2 of the inner member 43. Specifically, the present bearing device for vehicle wheels 41 has five hub bolts 44E, which are provided at a position where the phase angle around the rotation axis C2 is 72°. Therefore, in the present bearing device for vehicle wheels 41, the five guide grooves 42H are provided at positions where the phase angle around the rotation axis C2 is 72°. However, the guide groove 42H may be provided at ten locations whose number is a multiple. At this time, the guide groove 42H is provided at a position where the phase angle around the rotation axis C 2 is 36°. Further, although the bearing device for vehicle wheels 41 has five hub bolts 44E, four hub bolts 44E may be provided at a position where the phase angle around the rotation axis C2 is 90°. In this case, the four guide grooves 42H are provided at positions where the phase angle around the rotation axis C2 is 90°. However, the guide grooves 42H may be provided at eight locations that are twice locations. In addition, the same number of the guide grooves 42H as the hub bolt 44 may be provided.

By providing such a design, in the present bearing device for vehicle wheels 41, the positions of all the hub bolts 44E can be overlapped with all the guide grooves 42H, so that the exchanging work of the hub bolt 44E is facilitated and further maintainability can be improved.

Thirteenth Embodiment

Figure 27:
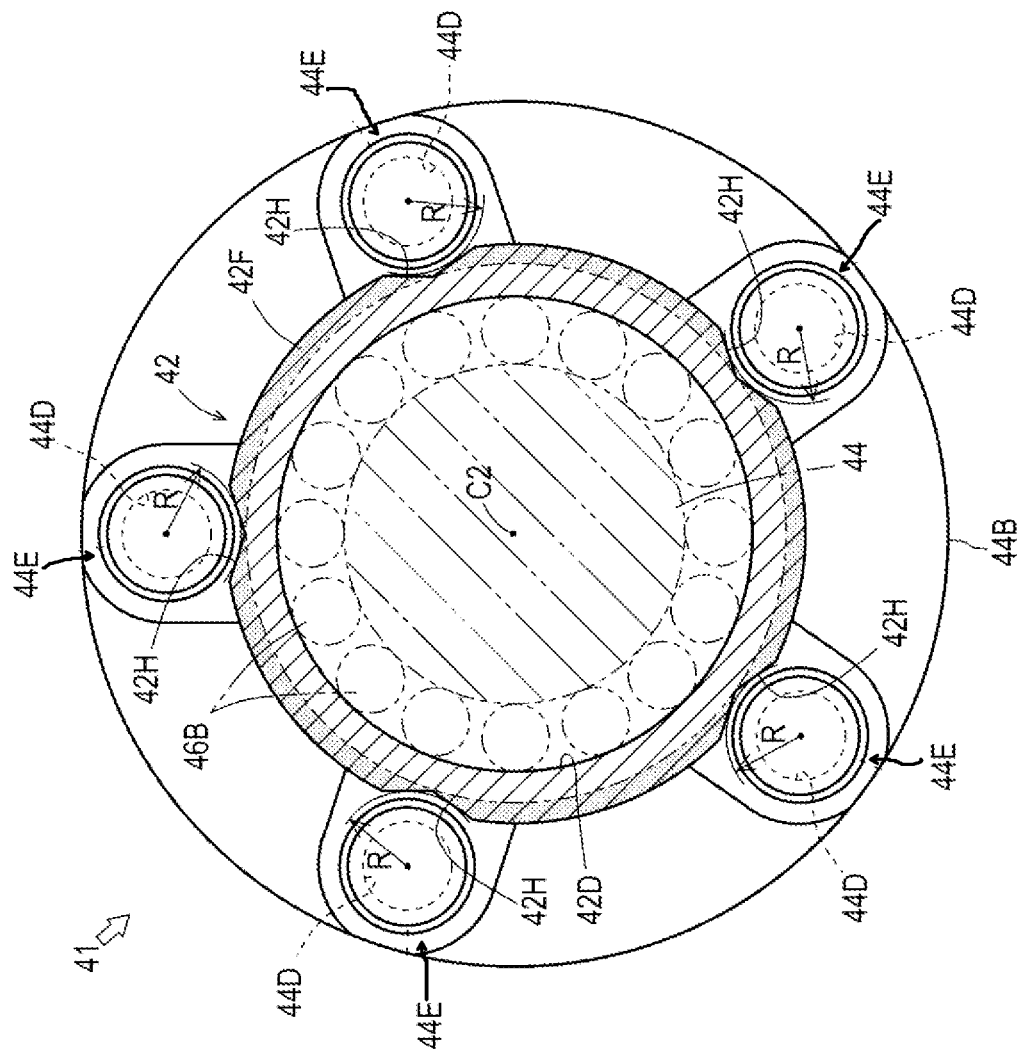
FIG. 27 is a cross-sectional view illustrating a main part structure of a bearing device for vehicle wheels of a twelfth embodiment.
Figure 28:
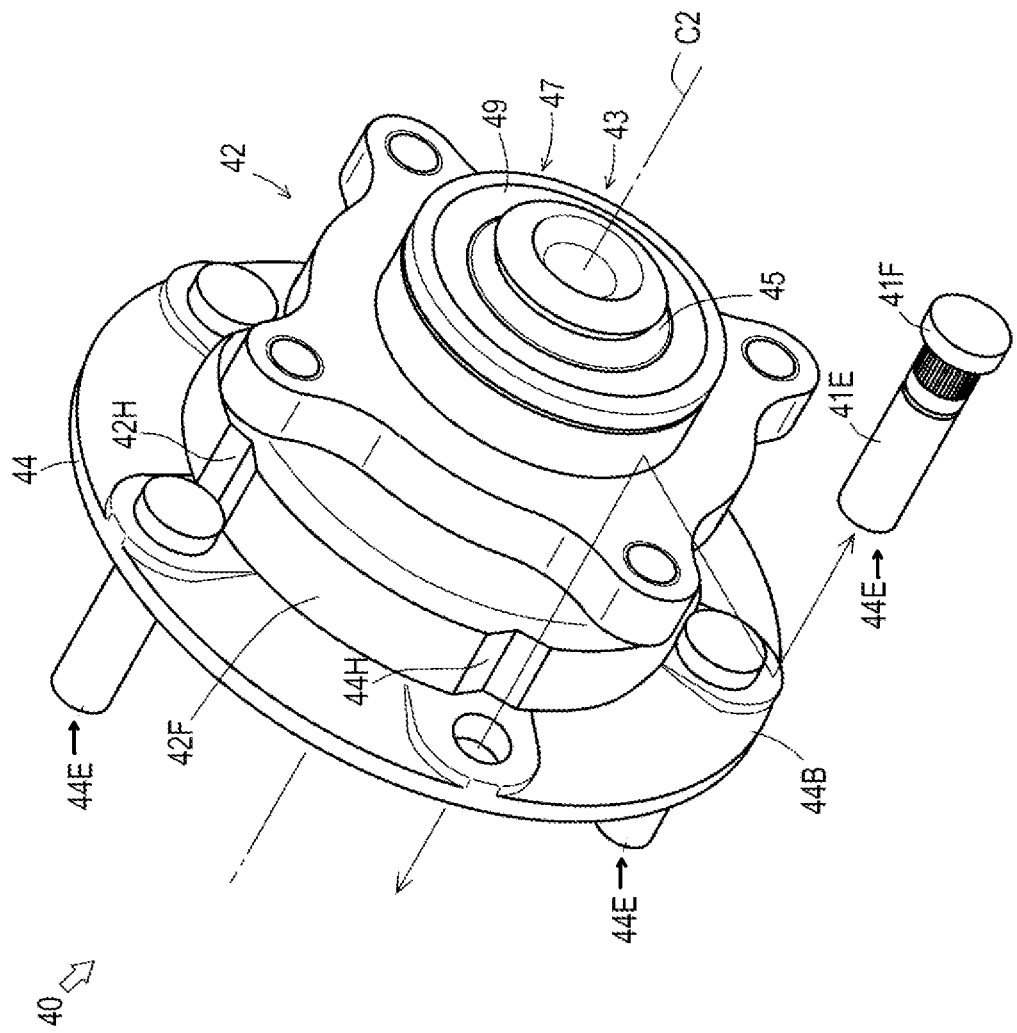
FIG. 28 is a diagram illustrating an exchanging work of a hub bolt.
Figure 29:
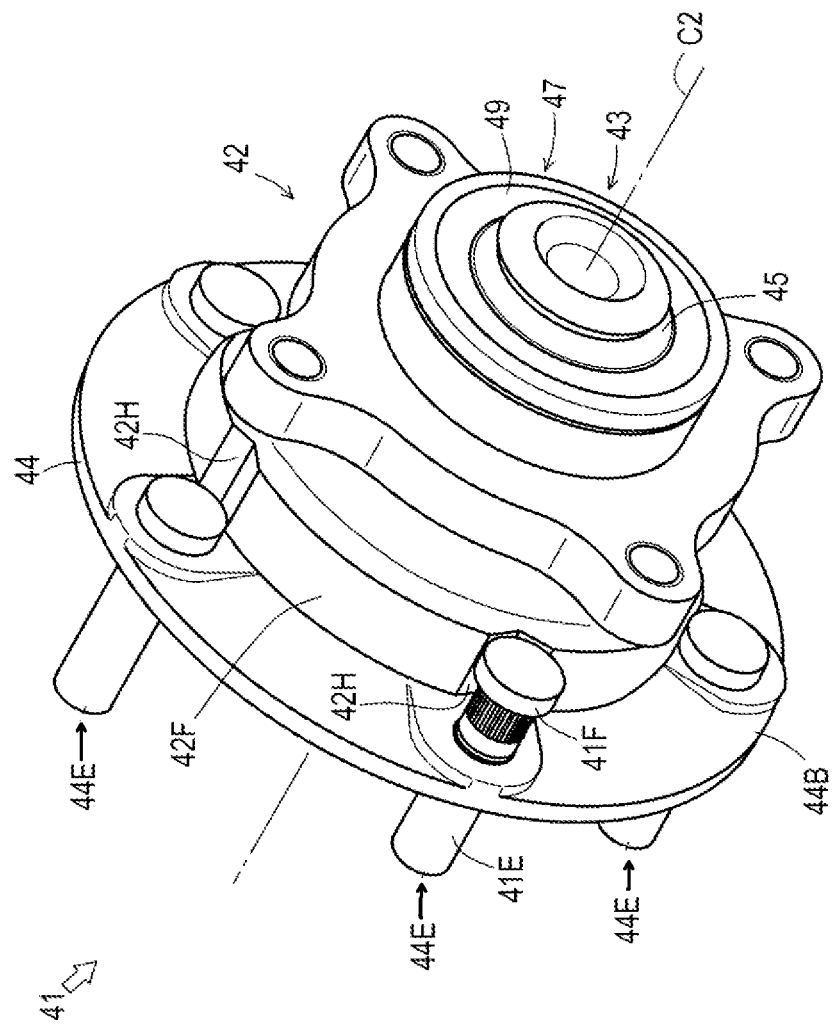
FIG. 29 is a view illustrating a situation in which a guide groove linearly supports the hub bolt.

Next, with reference to FIG. 27 to FIG. 29, the bearing device for vehicle wheels 41 according to a thirteenth embodiment will be described in detail. FIG. 27 is a cross-sectional view taken along the line E-E in FIG. 21. FIG. 28 shows the exchanging work of the hub bolt 44E. In addition, FIG. 29 shows a situation in which the guide groove 42H straightly supports the hub bolt 44E.

Also in the bearing device for vehicle wheels 41 of the thirteenth embodiment, the outer member 42 has a substantially cylindrical shape around the rotation axis C2 of the inner member 43. In addition, in the present bearing device for vehicle wheels 41, the shape of the cross section of the outer member 42 in the axial direction bulges outwardly at the outer side tip. That is, on the outer-side tip of the outer member 42, a thick portion 42F protruding in the radial direction is provided over the entire circumference. In the present bearing device for vehicle wheels 41, the thick portion 42F is provided from the outer side end surface of the outer member 42 to the position beyond the outer rolling surface 42D in the direction of the rotation axis C2. Therefore, in the present bearing device for vehicle wheels 41, the thickness dimension of the outer rolling surface 42D provided on the outer side is increased over the entire circumference. Therefore, the thickness dimension of the portion where the outer rolling surface 42D is provided is large and constant in the circumferential direction. This feature is performed by providing the thick portion 42F so as to cover at least the portion where the outer rolling surface 42D is provided.

By providing such a design, the present bearing device for vehicle wheels 41 has a simpler shape difference as compared with the conventional bearing device for vehicle wheels, but stiffness of the outer member 42 on the outer side is improved. Therefore, in the present bearing device for vehicle wheels 41, while an increase of an overall weight is minimized, deformation of the outer side opening of the outer member 42 can be reduced and by suppressing deterioration of roundness of the outer rolling surface 42D that is in contact with the ball row 46B, deterioration in rolling fatigue life can be prevented.

Furthermore, in the present bearing device for vehicle wheels 41, the guide groove 42H of the hub bolt 44E provided in parallel with the rotation axis C2 is provided in the thick portion 42F. In detail, in the present bearing device for vehicle wheels 41, a part of the thick portion 42F is recessed inward and the guide groove 42H of the hub bolt 44E is provided in parallel to the rotational axis C2.

By providing such a design, the bearing device for vehicle wheels 41 can attach and detach the hub bolt 44E through the guide groove 42H while the thick portion 42F is provided at the outer side tip of the outer member 42 (See FIG. 28). Therefore, in the present bearing device for vehicle wheels 41, it is possible to replace the hub bolt 44E without disassembling the outer member 42 and the inner member 43, so that maintainability can be improved.

In addition, the guide groove 42H is designed to have a predetermined shape. More specifically, the guide groove 42H has a slit-shape or a polygonal shape with which an arc centered on the through hole 4D is in contact, and the radius R thereof is substantially the same (similar or somewhat larger) as the radius of the head portion 41F configuring the hub bolt 44E. Therefore, when the screw portion 41E configuring the hub bolt 44E passes through the through hole 4D, the guide groove 42H is in the circumferential direction along, and is in contact with the outer peripheral surface of the head portion 41F configuring the hub bolt 44E. Therefore, when the hub bolt 44E is removed, pushing the screw portion 41E of the hub bolt 44E by a press machine can pull straight along the guide groove 42H (see FIG. 29). Further, when the hub bolt 44E is attached, tightening the thread portion 41E of the hub bolt 44E with a nut or the like can straightly insert along the guide groove 42H (see FIG. 29).

By providing such a design, in the present bearing device for vehicle wheels 41, since the guide groove 42H straightly supports the hub bolt 44E, the exchanging work of the hub bolt 44E is facilitated, and further maintainability can be improved.

In the present bearing device for vehicle wheels 41, the hub bolts 44E are provided at equal intervals concentrically around the rotation axis C2 of the inner member 43. Specifically, the present bearing device for vehicle wheels 41 has five hub bolts 44E, which are provided at a position where the phase angle around the rotation axis C2 is 72°. Therefore, in the present bearing device for vehicle wheels 41, the five guide grooves 42H are provided at positions where the phase angle around the rotation axis C2 is 72°. However, the guide groove 42H may be provided at ten locations whose number is a multiple. At this time, the guide groove 42H is provided at a position where the phase angle around the rotation axis C 2 is 36°. Further, although the bearing device for vehicle wheels 41 has five hub bolts 44E, four hub bolts 44E may be provided at a position where the phase angle around the rotation axis C2 is 90°. In this case, the four guide grooves 42H are provided at positions where the phase angle around the rotation axis C2 is 90°. However, the guide grooves 42H may be provided at eight locations whose number is a multiple.

By providing such a design, in the present bearing device for vehicle wheels 41, since the positions of all the hub bolts 44E can be overlapped with all the guide grooves 42H, the exchanging work of the hub bolt 44E is facilitated, and further maintainability can be improved.

Next, with reference to FIG. 30 and FIG. 31, a structure that can be applied to the bearing device for vehicle wheels 41 of each of the above-described embodiments will be described. FIG. 30 (A) and FIG. 30 (B) are cross-sectional views illustrating the structure of main parts of the bearing device for vehicle wheels 41. Likewise, FIG. 31 (A) and FIG. 31 (B) are cross-sectional views illustrating the structure of main parts of the bearing device for vehicle wheels 41.

As shown in FIG. 30(A), the thick portion 42F is provided from the outer side end surface of the outer member 42 to the outer periphery of the outer rolling surface 42D, and a width dimension W10 may be provided so as to be larger than a width dimension WJ from the outer side end surface of the outer member 42 to the position of the maximum outer diameter D2 of the outer rolling surface 42D (W10>WJ). That is, the thick portion 42F may be provided so as to cover the position of the maximum outer diameter D2 of the outer rolling surface 42D from the outer side end surface of the outer member 42. The thick portion 42F protrudes outward in the radial direction by a protrusion amount P4 so that a thickness T4 of the outer member 42 is equal to or greater than the reference value (for example, 5 mm to 8 mm).

Even with such a design, stiffness of the outer member 42 on the outer side is improved in the present bearing device for vehicle wheels 41. Therefore, the present bearing device for vehicle wheels 41 exhibits the same effect as the bearing device for vehicle wheels 41 of each embodiment.

In addition, as shown in FIG. 30 (B), the thick portion 42F is provided from the outer side end surface of the outer member 42 to the outer periphery of the outer rolling surface 42D, and a width dimension W11 thereof may be provided to have a value that is larger than a width dimension WK from the outer side end surface of the outer member 42 to the outer side edge of the outer rolling surface 42D and is smaller than the width dimension WJ from the outer side end surface of the outer member 42 to the position of the maximum outer diameter D2 of the outer rolling surface 42D (WJ>W11>WK). That is, the thick portion 42F may be provided so as to cover a part of the outer periphery of the outer rolling surface 42D from the outer side end surface of the outer member 42. The thick portion 42F protrudes outward in the radial direction by the protrusion amount P4 so that the thickness T4 of the outer member 42 is equal to or greater than the reference value (for example, 5 mm to 8 mm).

Even with such a design, stiffness of the outer member 42 on the outer side is improved in the present bearing device for vehicle wheels 41. Therefore, the present bearing device for vehicle wheels 41 exhibits the same effect as the bearing device for vehicle wheels 41 of each embodiment.

Further, as shown in FIG. 31 (A), the thick portion 42F is provided so as to surround the outer periphery of the outer rolling surface 42D, a width dimension W12 may be so as to be larger than a width dimension WL from the outer side edge to the inner side edge of the outer rolling surface 42D (W12>WL). That is, the thick portion 42F may be provided so as to cover the outer periphery from the outer-side edge to the inner-side edge of the outer rolling surface 42D. The thick portion 42F protrudes outward in the radial direction by the protrusion amount P4 so that the thickness T4 of the outer member 42 is equal to or greater than the reference value (for example, 5 mm to 8 mm).

Even with such a design, stiffness of the outer member 42 on the outer side is improved in the present bearing device for vehicle wheels 41. Therefore, the present bearing device for vehicle wheels 41 exhibits the same effect as the bearing device for vehicle wheels 41 of each embodiment.

In addition, as shown in FIG. 31 (B), the thick portion 42F is provided from the outer side end surface of the outer member 42 to the inclined portion provided on the outer periphery of the outer rolling surface 42D, a width dimension W13 may be provided to have a value that is larger than a width dimension WM from the outer side end surface of the outer member 42 to the position where the outer member 42 has the thinnest thickness T4 and is smaller than the width dimension WJ to the position of the maximum outer diameter D2 of the outer rolling surface 42D (WJ>W13>WM). That is, the thick portion 42F may be provided so as to cover a part of the inclined portion provided on the outer periphery of the outer rolling surface 42D from the outer side end surface of the outer member 42. The thick portion 42F protrudes outward in the radial direction by the protrusion amount P4 so that the thickness T4 of the outer member 42 is equal to or greater than the reference value (for example, 5 mm to 8 mm).

Even with such a design, stiffness of the outer member 42 on the outer side is improved in the present bearing device for vehicle wheels 41. Therefore, the present bearing device for vehicle wheels 41 exhibits the same effect as the bearing device for vehicle wheels 41 of each embodiment.

The present invention can be used in a bearing device for vehicle wheels.

The invention claimed is:

1. A bearing device for vehicle wheels, the bearing device comprising:
    an outer member integrally having a vehicle body mounting flange on an outer periphery of the outer member, and a multi-row annular outer rolling surfaces provided on an inner periphery of the outer member;
    an inner member having a hub ring having a wheel mounting flange for attachment to a wheel at one end portion and a small-diameter stepped portion extending in an axial direction of the inner member, and at least one inner ring press-fitted onto the hub small-diameter stepped portion, wherein the inner member has multi-row annular inner rolling surfaces provided on an outer periphery facing the multi-row outer rolling surfaces provided on the inner periphery of the outer member; and
    multi-row rolling elements disposed in a rollable manner between the inner rolling surfaces and the outer rolling surfaces,
    wherein the outer member includes an integrally formed thickened portion that is protruded by a predetermined amount in a radial direction with a predetermined width so that at least a part of the thickened portion on an outer peripheral surface of the outer member overlaps the outer rolling surface on the wheel mounting flange side of the outer member in the radial direction of the outer member.

2. The bearing device for vehicle wheels according to claim 1, wherein the thickened portion is provided so as to overlap a portion of the outer rolling surface closest to the outer peripheral surface of the outer member in the radial direction of the outer member.

3. The bearing device for vehicle wheels according to claim 1, wherein the thickened portion is provided so as to overlap a maximum outer diameter portion of the annular outer rolling surface in the radial direction of the outer member.

4. The bearing device for vehicle wheels according to claim 2, wherein the thickened portion is provided so as to overlap a maximum outer diameter portion of the annular outer rolling surface in the radial direction of the outer member.

5. The bearing device for vehicle wheels according to claim 1, wherein the thickened portion is provided so as to cover a portion where a straight line passing through a rolling element contact point of the outer rolling surface and a rolling element contact point of the inner rolling surface intersects the outer peripheral surface of the outer member.

6. The bearing device for vehicle wheels according to claim 2, wherein the thickened portion is provided so as to cover a portion where a straight line passing through a rolling element contact point of the outer rolling surface and a rolling element contact point of the inner rolling surface intersects the outer peripheral surface of the outer member.

7. The bearing device for vehicle wheels according to claim 3, wherein the thickened portion is provided so as to cover a portion where a straight line passing through a rolling element contact point of the outer rolling surface and a rolling element contact point of the inner rolling surface intersects the outer peripheral surface of the outer member.

8. The bearing device for vehicle wheels according to claim 4, wherein the thickened portion is provided so as to cover a portion where a straight line passing through a rolling element contact point of the outer rolling surface and a rolling element contact point of the inner rolling surface intersects the outer peripheral surface of the outer member.

\* \* \* \* \*